(12) United States Patent
Venkatesan et al.

(10) Patent No.: US 11,604,844 B2
(45) Date of Patent: Mar. 14, 2023

(54) SYSTEM AND METHOD FOR CROSS-DOMAIN RECOMMENDATIONS

(71) Applicant: Samsung Electronics Co., Ltd., Suwon-si (KR)

(72) Inventors: Shankar Narayan Venkatesan, Santa Clara, CA (US); Akshat Sehgal, Mountain View, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 412 days.

(21) Appl. No.: 16/253,019

(22) Filed: Jan. 21, 2019

(65) Prior Publication Data

US 2020/0142935 A1    May 7, 2020

Related U.S. Application Data

(60) Provisional application No. 62/755,964, filed on Nov. 5, 2018.

(51) Int. Cl.
*G06F 16/9535* (2019.01)
*G06F 16/901* (2019.01)
*G06F 16/9538* (2019.01)
*G06F 16/242* (2019.01)

(52) U.S. Cl.
CPC ...... *G06F 16/9535* (2019.01); *G06F 16/2423* (2019.01); *G06F 16/9024* (2019.01); *G06F 16/9538* (2019.01)

(58) Field of Classification Search
CPC ............. G06F 16/9535; G06F 16/9538; G06F 16/2423; G06F 16/9024
USPC ........................................................ 707/722
See application file for complete search history.

(56) References Cited

U.S. PATENT DOCUMENTS

| | | | |
|---|---|---|---|
| 8,219,598 B1 * | 7/2012 | Appleton | H04L 63/102 707/824 |
| 8,645,287 B2 | 2/2014 | Baker et al. | |
| 9,451,329 B2 * | 9/2016 | Whitman | H04N 21/232 |
| 9,582,802 B2 | 2/2017 | Bachenheimer et al. | |

(Continued)

FOREIGN PATENT DOCUMENTS

CN    101729321 B    11/2011
EP    2207348 A2    7/2010

(Continued)

OTHER PUBLICATIONS

"Cross-Platform App Recommendation by Jointly Modeling Ratings and Texts;" Da Cao, Xiangnan He, Liqiang Nie, Xiaochi Wei, Xia Hu, Shunxiang Wu, Tat-seng Chua; ACM; Oct. 2017; New York, NY.*

(Continued)

*Primary Examiner* — Giovanna B Colan

(57) ABSTRACT

An electronic device for providing cross-domain recommendations includes a memory and at least one processor coupled to the memory. The at least one processor is configured to receive one or more notifications of at least one user activity in a content provider application, build at least one query based on the one or more notifications, and provide the at least one query to a database, receive at least one cross-domain action from the database. The at least one processor is also configured to generate at least one cross-domain recommendation based on the cross-domain action and instruct an application to display the at least one cross-domain recommendation.

20 Claims, 17 Drawing Sheets

(56) References Cited

U.S. PATENT DOCUMENTS

| | | | | |
|---|---|---|---|---|
| 9,798,823 B2* | 10/2017 | Cody | ............... | G06F 16/955 |
| 10,558,682 B2* | 2/2020 | Whitman | ............... | G06N 20/00 |
| 10,803,391 B2* | 10/2020 | Sharifi | ............... | G06N 20/00 |
| 2002/0052873 A1* | 5/2002 | Delgado | ............... | G06Q 30/02 |
| 2010/0191682 A1* | 7/2010 | Takamatsu | ............... | G06Q 30/02 |
| | | | | 706/12 |
| 2011/0106744 A1* | 5/2011 | Becker | ............... | H04N 21/44224 |
| | | | | 706/46 |
| 2013/0097153 A1* | 4/2013 | Barbieri | ............... | G06F 16/78 |
| | | | | 707/722 |
| 2014/0074650 A1* | 3/2014 | Elias | ............... | G06Q 30/0631 |
| | | | | 705/26.7 |
| 2014/0279756 A1* | 9/2014 | Whitman | ............... | G06F 16/24578 |
| | | | | 707/771 |
| 2016/0132783 A1 | 5/2016 | Ning et al. | | |
| 2016/0179835 A1* | 6/2016 | Mika | ............... | G06F 16/9535 |
| | | | | 707/794 |
| 2016/0360382 A1* | 12/2016 | Gross | ............... | G06F 9/453 |
| 2017/0032548 A1 | 2/2017 | Grealish et al. | | |
| 2017/0075994 A1 | 3/2017 | Barbieri et al. | | |
| 2018/0089573 A1 | 3/2018 | Solenthaler et al. | | |
| 2018/0308124 A1* | 10/2018 | Gao | ............... | G06N 5/003 |
| 2019/0066186 A1* | 2/2019 | Singh | ............... | G06N 20/00 |

FOREIGN PATENT DOCUMENTS

| | | |
|---|---|---|
| EP | 2860672 A2 | 4/2015 |
| WO | 2006089137 A1 | 8/2006 |

OTHER PUBLICATIONS

International Search Report and Written Opinion regarding International Patent Application No. PCT/KR2019/014587, dated Feb. 13, 2020, 10 pages.

* cited by examiner

SYSTEM AND METHOD FOR CROSS-DOMAIN RECOMMENDATIONS

CROSS-REFERENCE TO RELATED APPLICATION AND CLAIM OF PRIORITY

This application claims priority under 35 U.S.C. § 119(e) to U.S. Provisional Patent Application No. 62/755,964 filed on Nov. 5, 2018 and entitled "System and Method for Cross-Domain Recommendations." This provisional patent application is hereby incorporated by reference in its entirety.

TECHNICAL FIELD

This disclosure relates generally to machine learning systems. More specifically, this disclosure relates to a system and method for cross-domain recommendations.

BACKGROUND

In existing situations where recommendations are provided, displays of recommendations are typically static in nature. Additionally, such recommendations are typically reminders, frequent contacts, etc., with very little intelligent analysis, resulting in a generic ranking order.

SUMMARY

This disclosure provides a system and method for cross-domain recommendations.

In one embodiment, an electronic device is provided. The electronic device includes a memory and at least one processor coupled to the memory. The at least one processor is configured to receive one or more notifications of at least one user activity in a content provider application, build at least one query based on the one or more notifications, provide the at least one query to a database, receive at least one cross-domain action from the database, generate at least one cross-domain recommendation based on the cross-domain action, and instruct an application to display the at least one cross-domain recommendation.

In another embodiment, a method is provided. The method includes receiving one or more notifications of at least one user activity in a content provider application, building at least one query based on the one or more notifications, providing the at least one query to a database, receiving at least one cross-domain action from the database, generating at least one cross-domain recommendation based on the cross-domain action, and instructing an application to display the at least one cross-domain recommendation.

In yet another embodiment, a non-transitory computer readable medium embodying a computer program for operating an electronic device including a memory and at least one processor is provided. The computer program includes computer readable instructions that, when executed by the at least one processor, cause the electronic device to receive one or more notifications of at least one user activity in a content provider application, build at least one query based on the one or more notifications, provide the at least one query to a database, receive at least one cross-domain action from the database, generate at least one cross-domain recommendation based on the cross-domain action, and instruct an application to display the at least one cross-domain recommendation.

Other technical features may be readily apparent to one skilled in the art from the following figures, descriptions, and claims.

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

Figure 1:
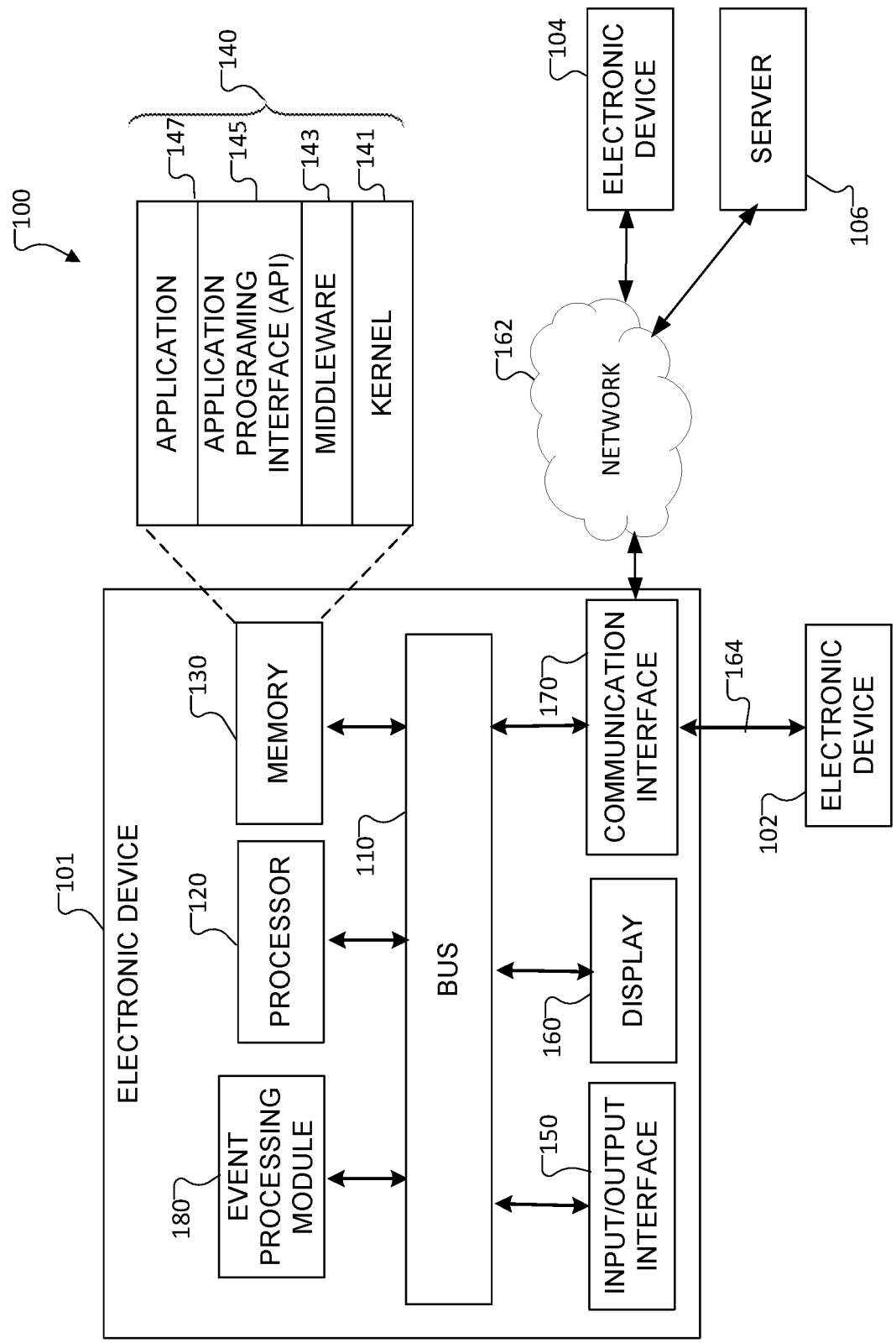
FIG. 1 illustrates an example network configuration in accordance with various embodiments of this disclosure.

FIGS. 1 through 16, discussed below, and the various embodiments of this disclosure are described with reference to the accompanying drawings. However, it should be appreciated that this disclosure is not limited to the embodiments and all changes and/or equivalents or replacements thereto also belong to the scope of this disclosure. The same or similar reference denotations may be used to refer to the same or similar elements throughout the specification and the drawings.

Before undertaking the DETAILED DESCRIPTION below, it may be advantageous to set forth definitions of certain words and phrases used throughout this patent document. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B," "at least one of A and/or B," or "one or more of A and/or B" may include all possible combinations of A and B. For example, "A or B," "at least one of A and B," and "at least one of A or B" may indicate all of (1) including at least one A, (2) including at least one B, or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for," "having the capacity to," "designed to," "adapted to," "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A, B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic appcessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such SAMSUNG HOMESYNC, APPLETV, or GOOGLE TV), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MM) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

In existing solutions where recommendations are provided, displays of recommendations are typically static in nature and often consist of reminders, frequent contacts, etc., with very little intelligent analysis, resulting in a generic ranking order. Such solutions may use an algorithmic feed to provide content, such as by providing traffic notifications based on a change in nearby traffic, news articles based on user preferences or linking of user feed content types, such as subject matter, displaying pre-configured partner content, providing information based on user searches such as flights or other information. Other information or content provided to the user may be ordered as defined by the user, such as by ordering widgets small user interfaces—on a display of an electronic device, such that the order and nature of the content is user-defined. This only provides the user with a stream of data specific to the widgets and does not alert the user to other, undiscovered content and services.

FIG. 1 illustrates an example network configuration 100 in accordance with various embodiments of this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network environment 100. The electronic device 101 can include at least one of a bus 110, a processor 120, a memory 130, an input/output (TO) interface 150, a display 160, a communication interface 170, or an event processing module 180. In some embodiments, the electronic device 101 may exclude at least one of the components or may add another component.

The bus 110 includes a circuit for connecting the components 120 to 180 with one another and transferring communications (such as control messages and/or data) between the components. The processor 120 includes one or more of a central processing unit (CPU), an application processor (AP), or a communication processor (CP). The processor 120 is able to perform control on at least one of the other components of the electronic device 101 and/or perform an operation or data processing relating to communication. In some embodiments, the processor can be a graphics processor unit (GPU). In accordance with various embodiments of this disclosure, the processor 120 can build cross-domain recommendation action queries, provide cross-domain actions and content query request information, display content like cross-domain recommendations including user interfaces and data related to the recommendations, receive and process user inputs related to content provider applications, cross-domain recommendations, or perform other actions as described in this disclosure.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or a memory 130) used to perform operations or functions implemented in other programs (such as the middleware 143, API 145, or application program 147). The kernel 141 provides an interface that allows the middleware 143, the API 145, or the application 147 to access the individual components of the electronic device 101 to control or manage the system resources. The application 147 can include a host application acting as a hub for user information, notifications, recommendations, and other content. A host application can be a display surface such as an intelligent assistant or digital assistance voice client, an intelligent assistant or digital assistant home user interface or recommendation user interface, etc. The host application can be displayed as a home screen on the electronic device 101 that interacts with other applications installed in the memory 130 of the electronic device 101, and with outside services such as services offered by mobile network service providers, device manufacturers, cloud computing services, or other services. The host application can also operate as a component of the operating system of the electronic device 101. The application 147 can also include other applications pre-installed on the electronic device 101 or installed by a user of the electronic device 101. Such applications can include applications that provide travel services, music services, news services, shopping services, video services, or other services. These functions can be performed by a single application, or multiple applications that each carry out one or more of these functions.

The middleware 143 can function as a relay to allow the API 145 or the application 147 to communicate data with the kernel 141, for example. A plurality of applications 147 can be provided. The middleware 143 is able to control work requests received from the applications 147, for example, by allocating the priority of using the system resources of the electronic device 101 (such as the bus 110, the processor 120, or the memory 130) to at least one of the plurality of applications 147.

The API 145 is an interface allowing the application 147 to control functions provided from the kernel 141 or the middleware 143. For example, the API 145 includes at least one interface or function (such as a command) for filing control, window control, image processing or text control.

The 10 interface 150 serves as an interface that can, for example, transfer commands or data input from a user or other external devices to other component(s) of the electronic device 101. Further, the IO interface 150 can output commands or data received from other component(s) of the electronic device 101 to the user or the other external device.

The display 160 includes, for example, a liquid crystal display (LCD), a light emitting diode (LED) display, an organic light emitting diode (OLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with the network 162 or 164 through wireless or wired communication to communicate with the external electronic device. The communication interface 170 can be a wired or wireless transceiver or any other component for transmitting and receiving signals, such as signals received by the communication interface 170 regarding content provider application signals, content, data and user interfaces, signals transmitted by the communication interface 170 regarding action queries for cross-domain recommendations, signals received by the communication interface 170 regarding cross-domain recommendation actions and content queries, or other signals.

The electronic device 101 further includes one or more sensors that can meter a physical quantity or detect an activation state of the electronic device 101 and convert metered or detected information into an electrical signal. For example, a sensor can include one or more buttons for touch input, one or more cameras, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an IR sensor, an ultrasound sensor, an iris sensor, a fingerprint sensor, etc. The sensor(s) can further include a control circuit for controlling at least one of the sensors included therein. Any of these sensor(s) can be located within the electronic device 101.

The wireless communication is able to use at least one of, for example, long term evolution (LTE), long term evolution-advanced (LTE-A), 5th generation wireless system (5G), mm-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a cellular communication protocol. The wired connection can include at least one of universal serial bus (USB), high definition multimedia interface (HDMI), recommended standard 232 (RS-232), or plain old telephone service (POTS). The network 162 may include at least one communication network, such as a computer network (like a local area network (LAN) or wide area network (WAN)), the Internet, or a telephone network.

The first and second external electronic devices 102 and 104 and server 106 each can be a device of the same or a different type from the electronic device 101. According to certain embodiments of this disclosure, the server 106 includes a group of one or more servers. Also, according to certain embodiments of this disclosure, all or some of operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162, the electronic device 101 may be independently operated without a separate communication function, according to embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. The server 106 can also include an event processing module (not shown) that may support the event processing module 180 implemented in the electronic device 101. For example, the event processing module 180 can process at least a part of information obtained from other elements (such as the processor 120, the memory 130, the input/output interface 150, or the communication interface 170) and can provide the same to the user in various manners.

While in FIG. 1 the event processing module 180 is shown to be a module separate from the processor 120, at least a portion of the event processing module 180 can be included or implemented in the processor 120 or at least one other module, or the overall function of the event processing module 180 can be included or implemented in the processor 120 or another processor. The event processing module 180 can perform operations according to embodiments of this disclosure in interoperation with at least one program 140 stored in the memory 130.

Although FIG. 1 illustrates one example of a communication system 100, various changes may be made to FIG. 1. For example, the system 100 could include any number of each component in any suitable arrangement. In general, computing and communication systems come in a wide variety of configurations, and FIG. 1 does not limit the scope of this disclosure to any particular configuration. While FIG. 1 illustrates one operational environment in which various features disclosed in this patent document can be used, these features could be used in any other suitable system.

Figure 2:
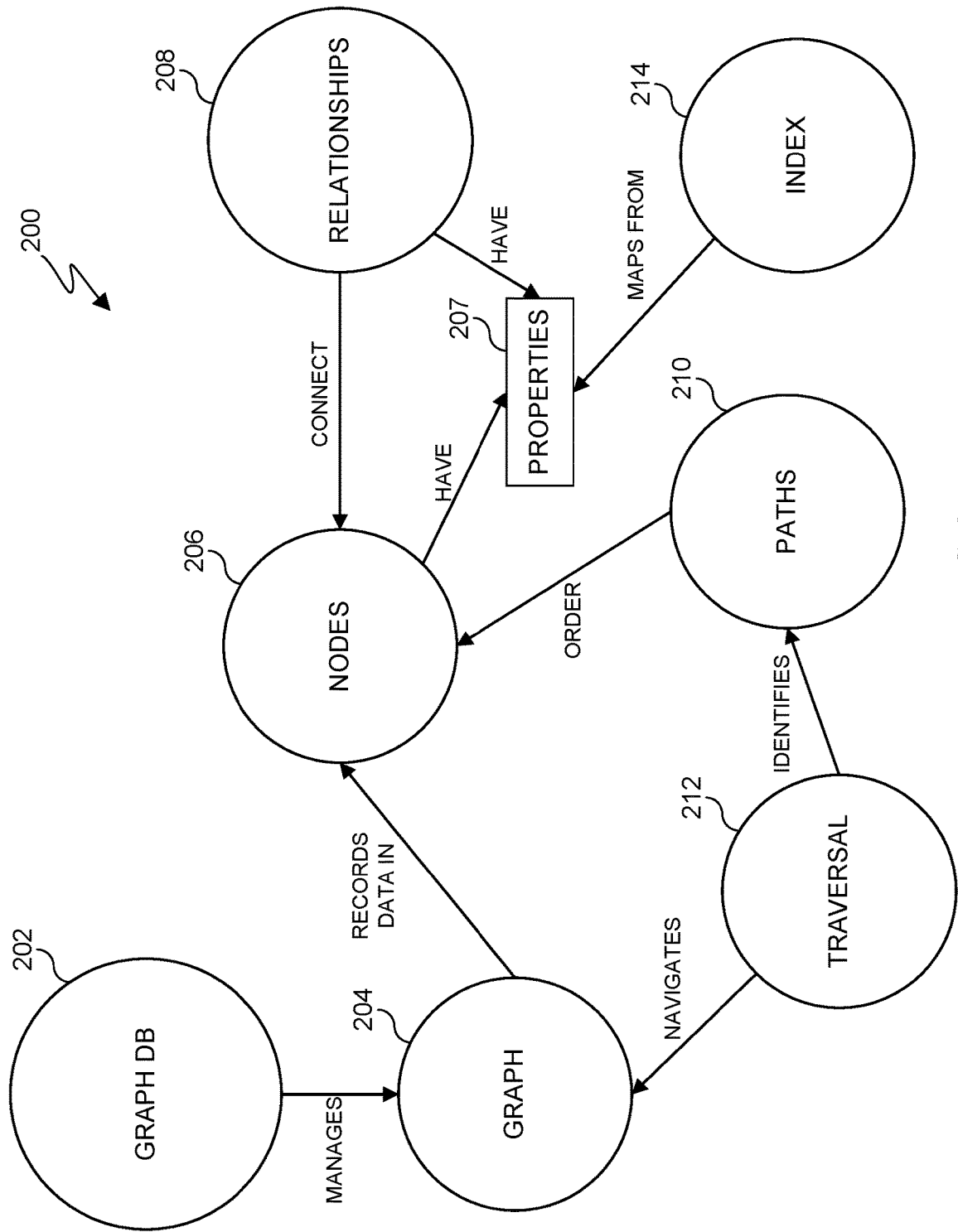
FIG. 2 illustrates an example graph database configuration in accordance with various embodiments of this disclosure.

FIG. 2 illustrates an example graph database configuration 200 in accordance with various embodiments of this disclosure. A graph database is a database that uses graph structures for semantic queries. The graph database includes nodes, edges or relationship paths between the nodes, and properties to represent and store data. Relationships between the nodes allow data to be linked together directly and can allow for data to be retrieved in one operation. Graph databases allow for fast querying of data, as the relationships are perpetually stored in the database itself. Since graph databases allow for relationships to be intuitively visualized, graph databases are useful for heavily interconnected data.

As illustrated in FIG. 2, the example graph database configuration 200 includes a graph database 202 that manages a graph 204. The processor 120 of the electronic device 101, 102, 104 or the server 106 can execute the graph database 202 or retrieve data from the graph database 202. The graph database 202 can be stored on the electronic device 101, 102, 104, the server 106, or other storage location accessible over the network 162 or 164. In some embodiments, actions on the electronic device 101, 102, 104 trigger a query to the server 106 to provide data from the graph database 202, where the server 106 then transmits the data to the electronic device 101, 102, 104.

The graph 204 records data in nodes 206 that have associated properties 207. Properties 207 can include data stored in relation to the nodes or other objects in the graph database 202. In some embodiments, the nodes 206 can represent a unique object representative of the result of an action performed on a content provider's application, such as an app running on a mobile device. The configuration 200 further illustrates that relationships 208 connect the nodes 206 and form paths 210 between nodes 206 that serve to order the nodes 206 by their relation to other nodes 206 connected by the relationships 208. Each path 210 begins on a node and ends on a node. Traversal functions 212 navigate the graph 204 by identifying the paths 210. The relationships 208 also can include properties 207 that provide various data used for the relationships and can provide the data from a node 206 to another node 206. An index 214 is mapped from the properties 207 of the nodes 206 and relationships 208, indexing the nodes and their relationships to provide fast retrieval of data from the graph database 202.

In some embodiments, for example, a relationship 208 can represent a unique user action that correlates two nodes 206. For instance, a node 206 representing a flight booking reservation action in a flight booking content provider application and another node 206 representing a rental car reservation action in a car rental content provider application can be connected by a relationship 208. The relationship 208, for example, can represent an action of reserving a flight in the flight booking content provider application. Such a relationship 208 between the two nodes 206 provides that, when a user reserves a flight using the flight booking application, the relationship between the two nodes causes the user to be provided with the opportunity (or recommendation) to also book a car rental using the car rental application. Properties 207, such as user information, flight information including travel destination, dates, or other information, or other properties 207 can be provided by the relationship 208 from the flight application node 206 to the car rental application node 206, enabling the car rental application to receive pre-filled data to use in providing the recommendation. One or more graph databases 202 can be created for a single user to provide any number of such relationships 208 between actions defined by nodes 206, and the one or more graph databases 202 can be dynamically created based on user preferences, user behavior or activities such as frequency of use of certain actions, or other factors.

In some embodiments, labels are assigned to nodes 206 to identify co-occurring nodes amongst different occurrences of user graphs 204 stored in the graph database 202. For example, a label applied to a node 206 in a first graph database 202 can indicate that the node 206 represents an action or application in a first domain, and a label applied to another node 206 in the first graph database 202 can indicate that the other node 206 represents an action or application in a second domain. Labels can also define other aspects of nodes 206, such as if a node 206 is associated with a user-preferred service. For example, the node 206 in the first domain can be a music application action and thus be in a music domain, whereas the other node 206 in the second domain can be a hotel reservation application action and thus be in a hotel reservation domain and/or a travel domain. The first graph database 202 can have multiple nodes 206 labeled with the same domain and multiple nodes 206 labeled with any other domain type. This allows for the co-referencing of nodes in the same domain that provide different services or the co-referencing of nodes 206 in different domains.

Relationship types can also be assigned to relationships 208, which define the actions that trigger traversals between nodes. For example, a first node 206 connected to two other nodes 206 each providing a different action recommendation is a service action co-referencing of those different actions with respect to the first node 206 as further described below.

A second graph database 202 can also be configured such that labels are applied to nodes 206 to indicate the domains of the nodes 206 and relationship types applied to relationships 208 between nodes 206 to indicate the relationship actions. This allows for identification of co-occurring nodes between different graphs 204 related to the same user. For example, a specific action performed by the user in two different contexts can create a first node 206 in two different graphs 204. The first graph 204 can create a node 206 connected to the first node 206 in a domain, while the second graph 204 also creates a node 206 connected to the first node 206 that is in the same domain, which can be triggered by the same action or relationship type, but that is associated with different services or a different content provider connected to the first node 206. For example, the first node 206 in each of the first and second graphs 204 can represent a music domain application. In the first graph 204, a node 206 can be created and connected to the first node 206 to provide a recommendation of attending a concert event for an artist browsed by the user in the music application, where the recommendation is provided by a first content provider in a live event domain. In the second graph 204, a node 206 can be created and connected to the first node 206 to provide a recommendation of attending a concert event for the artist browsed by the user in the music application, where the recommendation is provided by a second content provider in a live event domain. Practically, this results in the user being offered a live event recommendation by two different content providers, such as two different ticket booking applications, as a result of the same user action. This is a service action co-occurrence as further described below. Co-referencing and co-occurrence of nodes thus allows for the recommendation of services to user and for the discovery of new services to users.

As described above, graph databases include graphs 204 that include entities, such as nodes 206 or relationships 208. Entities include unique, comparable identities that define whether or not two entities are equal. An entity is assigned a set of properties 207, each of which is uniquely identified by its respective property key. Nodes 206 are entities of a graph 204, with the unique attribute of being able to exist in and of itself. A node 206 can be assigned a set of unique labels, can have zero or more outgoing relationships 208, and can have zero or more incoming relationships 208. A relationship 208 is an entity that encodes a directed connection between two nodes 206, namely a source node and a target node. An outgoing relationship is a directed relationship from the point of view of the relationship's source node. An incoming relationship is a directed relationship from the point of view of the relationship's target node. A relationship can be assigned a relationship type. A path 210 represents a walk through a property graph and includes a sequence of alternating nodes 206 and relationships 208. The smallest path includes a single node and is designated as an empty path. A path 210 has a length, which can be an integer that is equal to the number of relationships 208 in the path 210. A path 210 can be of length N, such as a length of three, starting from any node and connecting to various other nodes 206 in the same domain or in other domains. It will be understood that a graph 204 can include any number of nodes 206, relationships 208, and paths 210.

Graphs 204 can also include tokens, which can be nonempty strings of unicode characters. Labels are tokens assigned to nodes 206 as described with respect to various embodiments of this disclosure. Relationship types are tokens assigned to relationships 208 as described with respect to various embodiments of this disclosure. A property key is a token that uniquely identifies an entity's property 207. A property 207 is a pair including a property key and a property value and defines aspects of a node 206, relationship 208, or other entity as described with respect to various embodiments of this disclosure.

Figure 3:
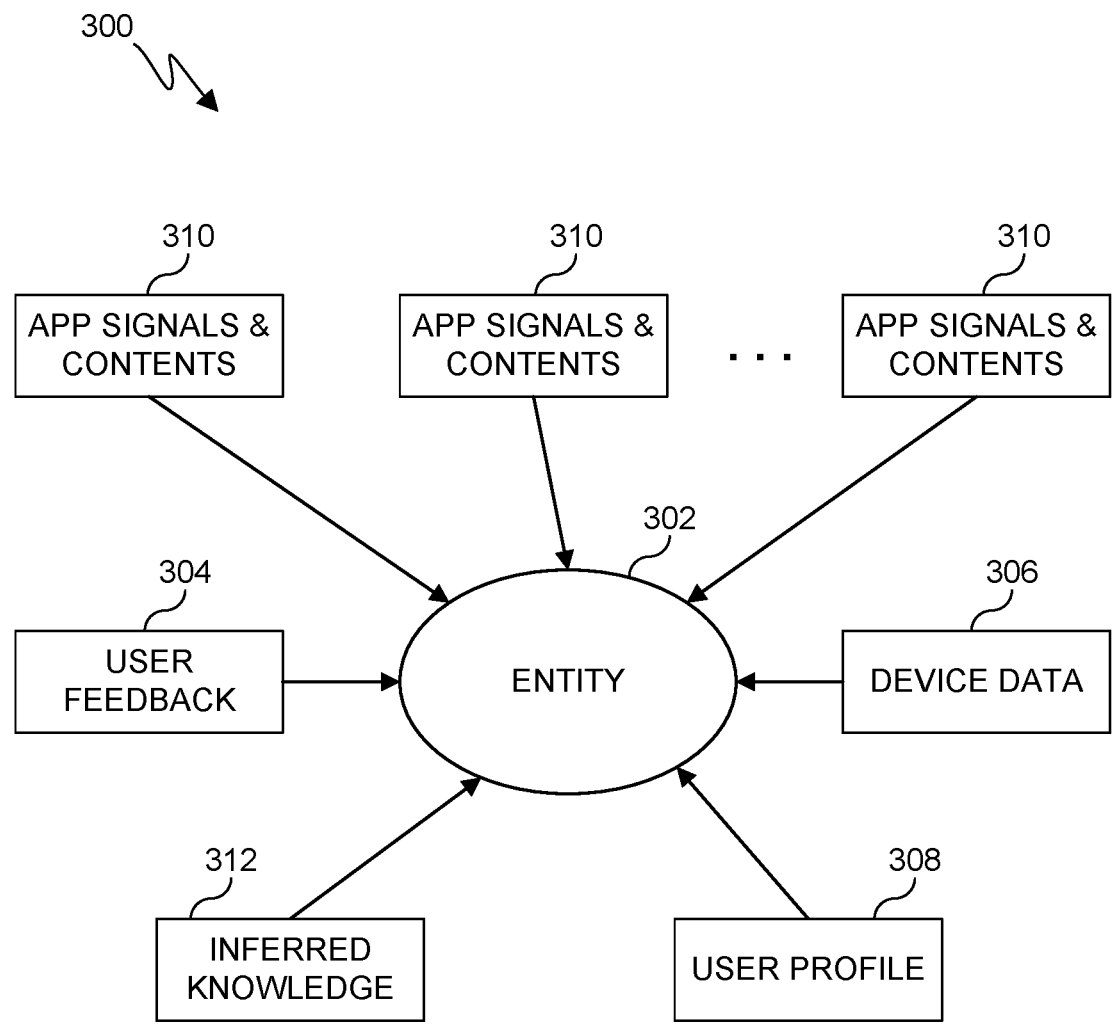
FIG. 3 illustrates an example entity data relationship model in accordance with various embodiments of this disclosure.

FIG. 3 illustrates an example entity data relationship model 300 in accordance with various embodiments of this disclosure. As shown in FIG. 3, the model 300 includes an entity 302. As described in this disclosure, the entity 302 can be a node 206, a relationship 208, or other entity in a graph database. As illustrated in FIG. 3, the entity 302 is surrounded by data, such as user feedback 304, device data 306, user profile data 308, one or more application signals and contents 310, and inferred knowledge 312. The data provided to the entity 302 provides for entity definitions and entity understanding, enables the entity to derive relations to other entities, and can define entity graphs. Direct user feedback 304 provides the entity 302 with knowledge of user preferences, such as if a user indicates that a service recommendation provided to the user via the user's electronic device 101 is not desired by the user or if a particular service is preferred over another services.

The entity 302 can also collect data regarding user usage patterns and behaviors from the device data 306 and the user profile data 308. Device data 306 can include data from a user's electronic device 101, such as installed applications, frequency of use of applications or services on the device, device model or specifications, a geolocation of the device, or other data. For example, the device data 306 can affect whether a particular service is offered or recommended to a user based on which applications are installed or used frequently. In some embodiments, the services from applications not installed or infrequently used may not be recommended, or the services from applications not installed or infrequently used may be recommended to educate the user about available and potentially alternative services. The device model or specifications can, in some embodiments, be used to filter out services that are not supported by the device. A geolocation of the device can be used to prioritize services to recommend to the user based on the geolocation of the device. For example, if, based on the geolocation of the user, there are more drivers of one rideshare or taxi service (e.g., UBER) nearby than drivers from another rideshare or taxi service (e.g., LYFT), a recommendation to use the first service (e.g., UBER) can be prioritized. User profile data 308 can provide data on user settings and preferences, user demographics, and other user profile information to assist with tailoring recommendations for the user.

Application signals and contents 310 provide the entity 302 with data from applications, such as signals related to a user action in an application and the content associated with the action. The entity 302 also can receive inferred knowledge 312 provided from sources such as user activity. For example, if a user swipes away or dismisses a recommendation displayed on the user's device, it can be inferred that the user is not interested in recommendations for that particular service. The data surrounding the entity 302 enables the creation of relations between entities to curate and add actionable instances and leads to relevant and focused recommendations for individual users.

Figure 4:
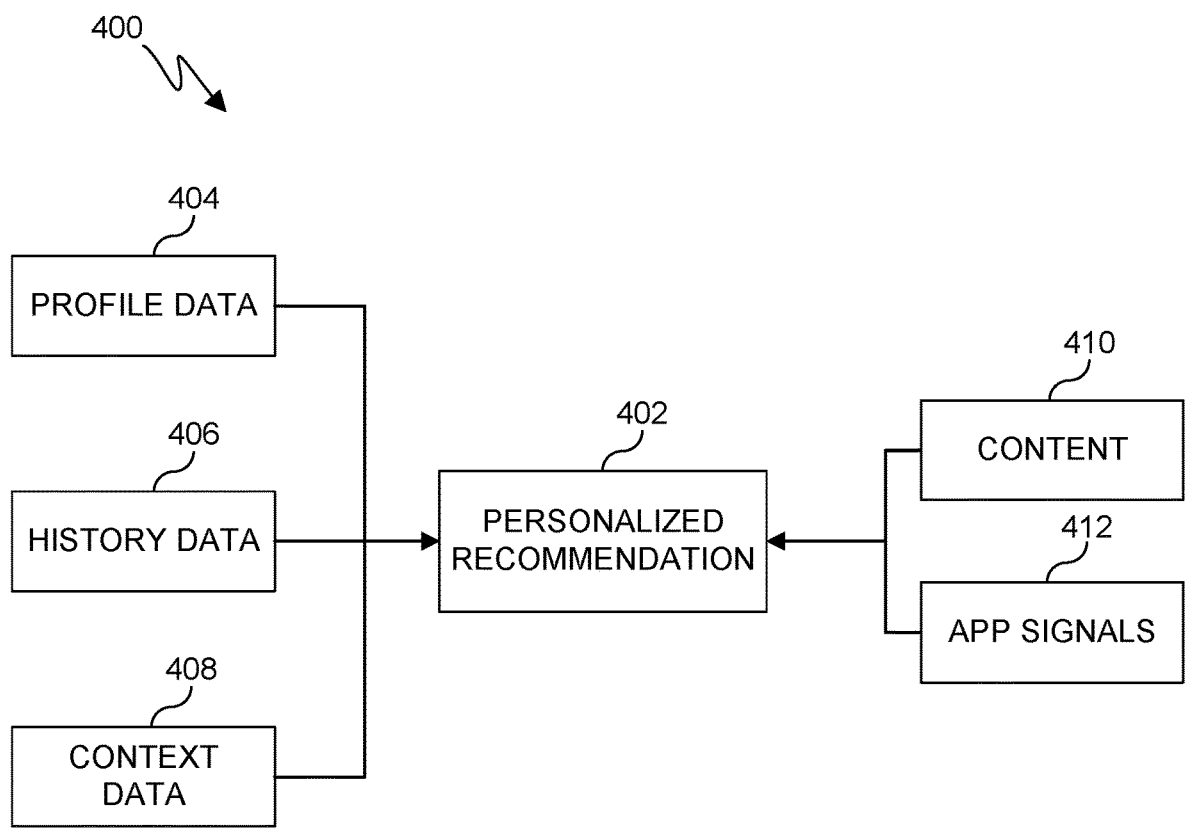
FIG. 4 illustrates an example personalized recommendation model in accordance with various embodiments of this disclosure.

FIG. 4 illustrates an example personalized recommendation model 400 in accordance with various embodiments of this disclosure. A personalized recommendation 402 is provided to a user in accordance with various embodiments of this disclosure. The personalized recommendation 402 can be, for example, presented in a host application of an electronic device 101. In some embodiments, a host application can be a display surface, such as an intelligent assistant or digital assistance voice client, an intelligent assistant or digital assistant home user interface, a recommendation user interface, etc. A host application can also be displayed as a home screen on the electronic device 101 that interacts with other applications installed in the memory 130 of the electronic device 101 and with outside services, such as services offered by mobile network service providers, device manufacturers, cloud computing services, or other services. The personalized recommendation 402 is built using a plurality of data, such as profile data 404, history data 406, context data 408, content 410, and application signals 412. The data 404-412 can include any of the data 304-312 described above with respect to FIG. 3.

The profile data 404 provides data related to the profile of a user, such as user preferences and settings. The history data 406 can provide history-related data of the user or the device, such as prior use of applications or services, refusal of the user to accept or interact with services or recommendations, or other data concerning user or device history.

Context data 408 can include data related to the context of a situation, such as geolocation of a device, current use of applications or services, or other context data. The content 410 can include content provided by applications or services for which the personalized recommendation 402 is associated. For example, if the personalized recommendation 402 is for a restaurant booking application, a user interface for the restaurant booking application can be provided from the content provider for the application as part of the personalized recommendation 402. In some embodiments, the user interface can be displayed in the host application as part of the display of the personalized recommendation 402. The application signals 412 provide signals for triggering and creating the personalized recommendation 402 and can provide the signals for initiating the service or application offered by the personalized recommendation. In some embodiments, activation or acceptance of the personalized recommendation 402 will allow for fulfillment of the service in the host application, open the content provider application to fulfill the service, redirect the user to the content provider's website to fulfill the service, or other means of fulfilling the service.

Figure 5:
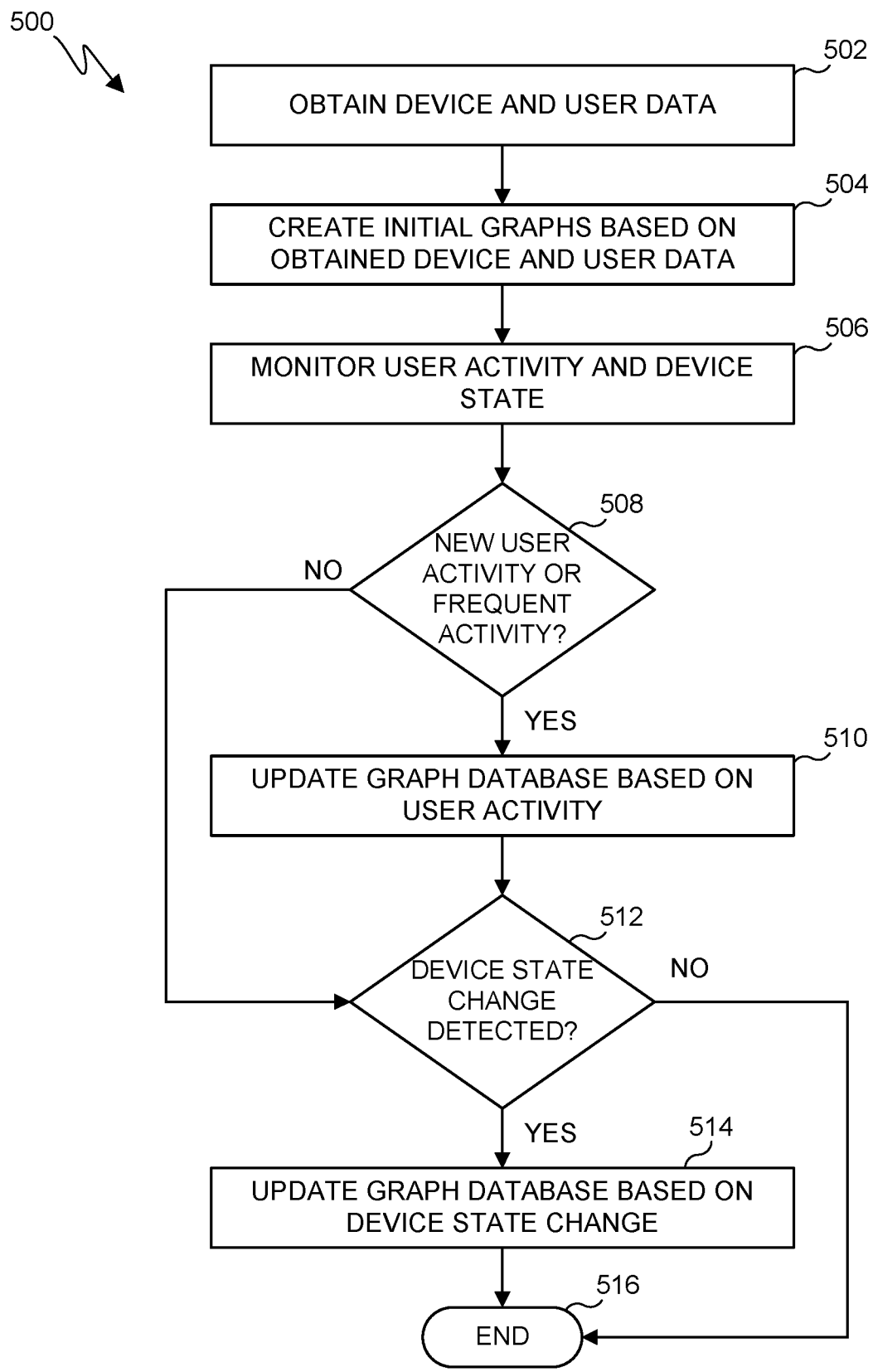
FIG. 5 illustrates a flowchart of an example graph database creation and update process in accordance with various embodiments of this disclosure.

FIG. 5 illustrates a flowchart of an example graph database creation and update process 500 in accordance with various embodiments of this disclosure. FIG. 5 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 500 is described with respect to the processor 120 of any, or a combination, of the electronic devices 101, 102, or 104, or the server 106. However, the process 500 can be used with any other suitable device(s) and in any suitable system.

At block 502, the processor obtains device and user data associated with a user. At block 504, the processor creates an initial graph database based on the obtained device and user data. In some embodiments, if there is no or little useful device and user data, a default graph database can be created for the user to provide a starting point for customization and to provide default application or service suggestions to the user. Also, in some embodiments, if there is a certain amount of useful device and user data, the initial graph database can be initially customized according to the device and user data. Further, in some embodiments, the device and user data may include user profile data, user feedback data, device model and specifications, history data, context data, and/or inferred knowledge that can be included in the initial graph database.

At block 506, the processor monitors user activity and a device state of the user device. At decision block 508, the processor determines if new user activity or frequent activity is detected from monitoring the user activity. New user activity can include activities such as using an application for the first time, accepting a new cross-domain recommendation provided to the user, or browsing content on a content provider application. Frequent user activity can include activities such as accepting a particular recommendation at a certain frequency, frequent use of particular applications, or frequent browsing of content in content provider applications.

If the processor identifies new user activity or frequent user activity at decision block 508, the process 500 moves to block 510. At block 510, the graph database is updated based on the user activity. For example, if a user frequently uses a sports news application, one or more nodes related to this domain can be added to one or more graphs to the graph database. Relationships can also be added to the graphs, such as creating relationships between the newly-added sports news application nodes and related nodes, such as event ticketing applications, in order to provide sports event ticketing recommendations to the user when the user uses the sports news application. The process 500 moves to decision block 512 from block 510. If the processor does not detect new or frequent user activity at decision block 508, the process 500 moves to decision block 512.

At decision block 512, the processor determines if there is a detected change in device state. A change in device state can include installing or uninstalling applications, a change in the geolocation of the device, a change in device bandwidth, a network change, or other changes. If the processor detects a device state change at decision block 512, the process 500 moves to block 514. At block 514, the processor updates the graph database based on the detected device state change. For example, if the device state change indicates that the device has a newly-installed application, one or more user graphs in the graph database can be updated to include nodes pertaining to the newly-installed application. The one or more user graphs can also be updated to include other nodes for applications or services in the same or related domains as the newly-installed application but that are not necessarily installed on the device. The process 500 then moves to end block 516. If the processor does not detect a device state change at decision block 512, the process 500 also moves to end block 516.

Figure 6:
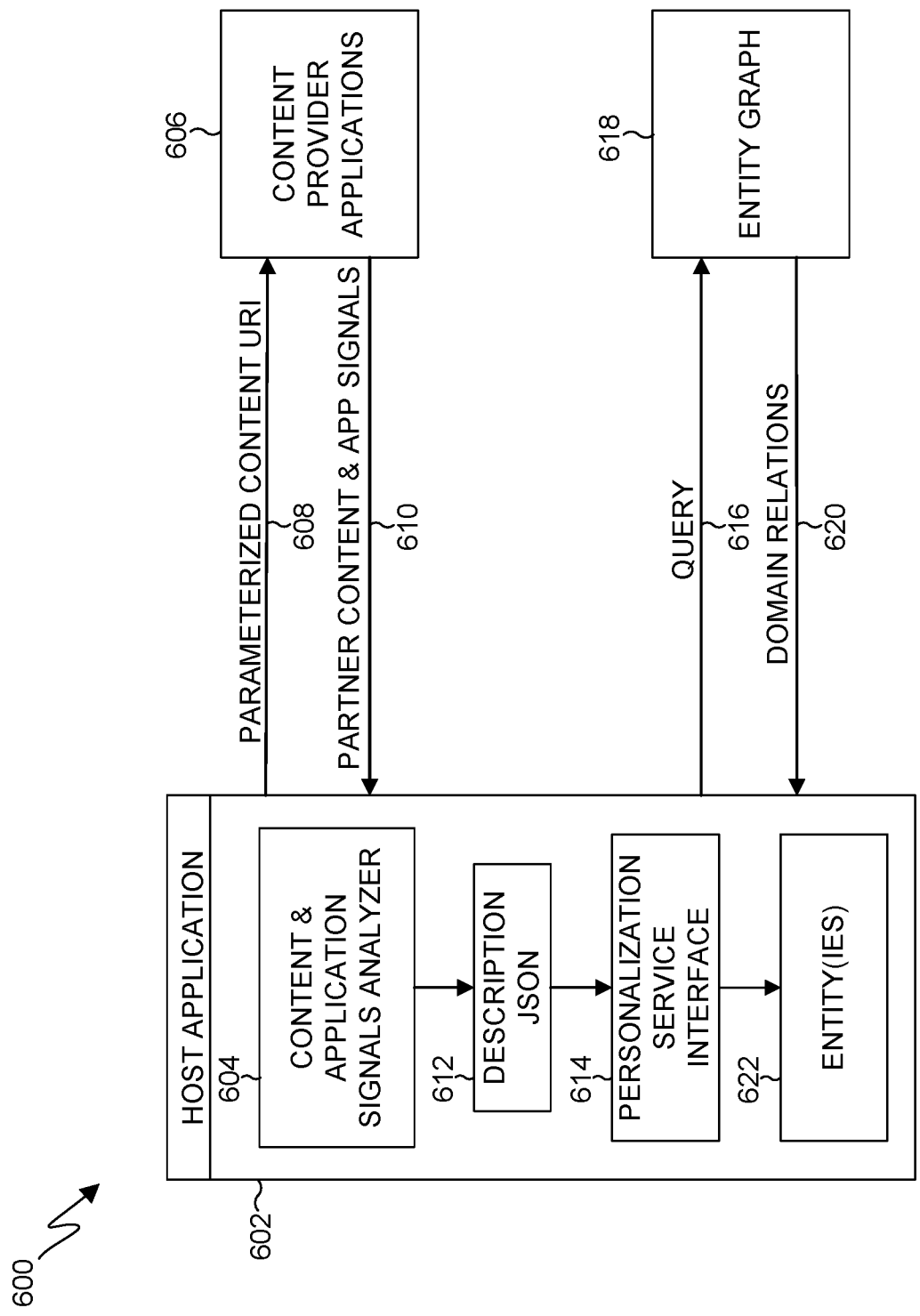
FIG. 6 illustrates an example cross-domain recommendation querying system in accordance with various embodiments of this disclosure.

FIG. 6 illustrates an example cross-domain recommendation querying system 600 in accordance with various embodiments of this disclosure. The system 600 includes a host application 602. In some embodiments, the host application 602 can be displayed as a home screen on the electronic device 101 that interacts with other applications installed in the memory 130 of the electronic device 101 and with outside services, such as services offered by mobile network service providers, device manufacturers, cloud computing services, or other services. The host application 602 can be executed by the processor 120. The host application 602 can also provide voice recognition and voice assistant services to users. The host application 602 includes a content and application signals analyzer 604 that receives and analyzes content and signals from content provider applications 606. As illustrated in FIG. 6, the host application 602 can send a parameterized content uniform resource identifier ("URI") 608 that identifies a particular resource and requests content from that resource. Content provider applications 606 can be applications installed on the electronic device 101 or can be content provider servers or other storage or communication locations for content providers.

In response to the parameterized content URI 608, a content provider application provides content and application signals 610. In some embodiments, the content and application signals 610 can be transmitted to the host application 602 without the host application 602 first sending a URI to a content provider application 606. The content and application signals analyzer 604 processes the content and application signals 610 and generates, from the content and application signals 610, a description JavaScript Object Notation ("JSON") 612. The description JSON 612 is provided to a personalization service interface 614 of the host application 602. The personalization service interface 614 determines what actions were performed by the content provider applications 606, and the content associated therewith, and builds a query 616 to send to an entity graph 618. The entity graph 618 can be managed by a graph database and can be either on the same device as the host application 602 or on a separate device, such as the server 106.

The query 616 includes information related to the actions performed by the content provider applications 606, which allows the entity graph 618 to return relevant cross-domain relations 620 to the host application 602, such as cross-domain actions to be recommended to the user. The cross-domain relations 620 can also include request information that allows the host application 602 to build another query to send to the content provider applications 606, such as in another parameterized content URI 608, to request content information for the cross-domain relations 620 provided by the entity graph 618. The personalization service interface 614 can use the information provided in the cross-domain relations 620 to update one or more entities 622 and can present the entities 622 as recommended actions, which may be in-domain or cross-domain, to the user within the host application 602 or outside the host application 602, such as in another screen of the electronic device 101, a content provider application 606, or other locations.

Figure 7:
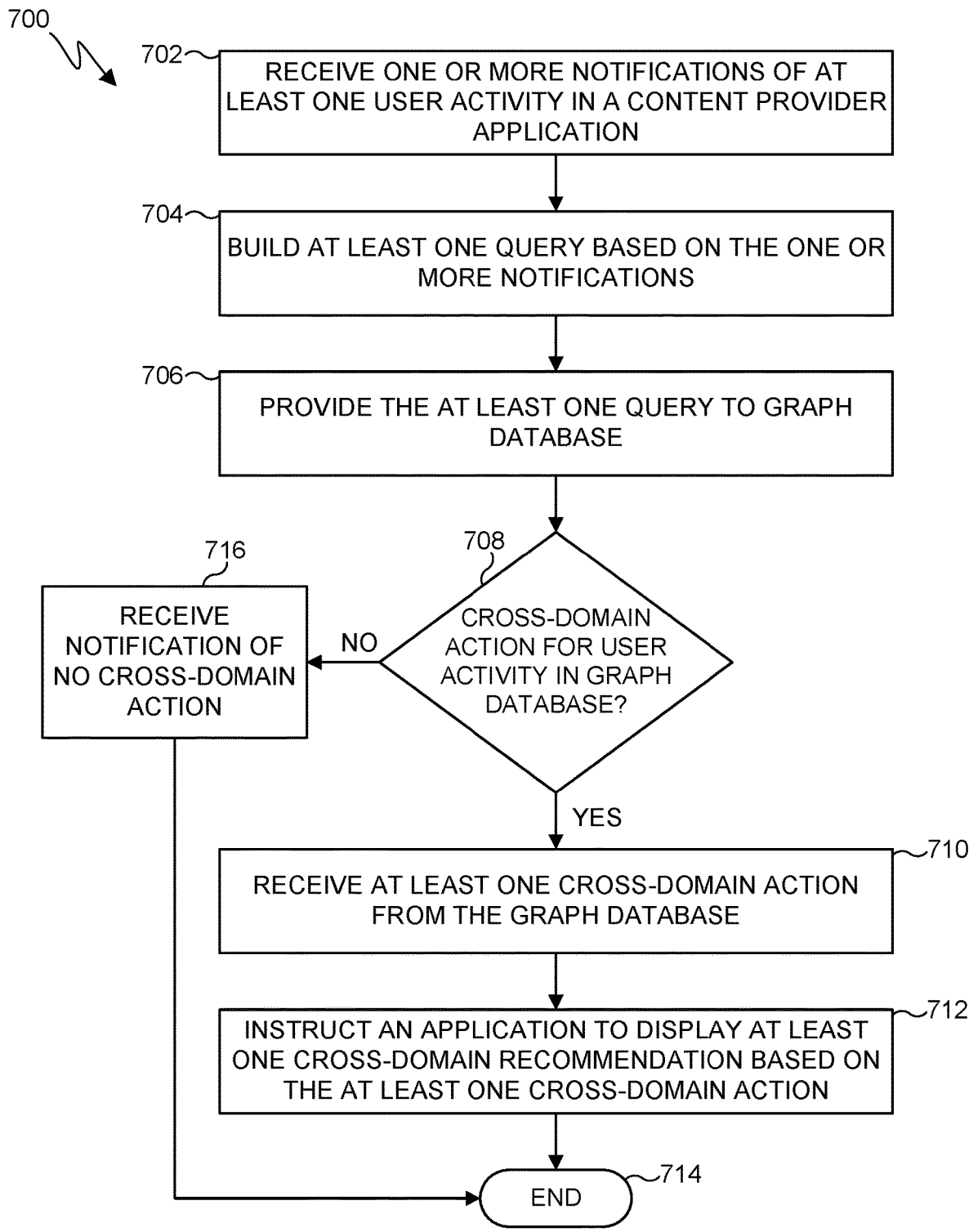
FIG. 7 illustrates a flowchart of an example cross-domain recommendation process in accordance with various embodiments of this disclosure.

FIG. 7 illustrates a flowchart of an example cross-domain recommendation process 700 in accordance with various embodiments of this disclosure. FIG. 7 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 700 is described with respect to the processor 120 of any, or a combination, of the electronic devices 101, 102, or 104, or the server 106. However, the process 700 can be used with any other suitable device(s) and in any suitable system.

At block 702, the processor receives one or more notifications of at least one user activity in a content provider application. In some embodiments, the one or more notifications can include application content and signals provided by one or more content provider applications. At block 704, the processor builds at least one query based on the one or more notifications. In some embodiments, the query can include information relating to application content and signals with respect to the user activity and can include a description JSON 612 representing the content and signals. At block 706, the processor provides the at least one query to a graph database that includes one or more user graphs. In some embodiments, the graph database can be stored locally. In other embodiments, the query can be transmitted to a remote device, such as the server 106, which stores the graph database or otherwise has access to the graph database.

At decision block 708, the processor determines if there is a cross-domain action for the user activity in the graph database. If so, the process 700 moves to block 710. At block 710, the processor receives at least one cross-domain action from the graph database. At block 712, the processor instructs an application, such as a host application, to display at least one cross-domain recommendation based on the at least one cross-domain action. It will be understood that this is but one example, and the recommended action could be an in-domain action. For example, a user activity of browsing music in a music player application may trigger an in-domain recommendation for buying music from similar artists in the same application. The process then moves to end block 714. If the processor does not determine that there is a cross-domain action in the graph database at decision block 708, the process 700 moves to block 716. At block 716, the processor receives a notification that there is no cross-domain action for the user activity, and the process 700 then moves to end block 714.

Figure 8:
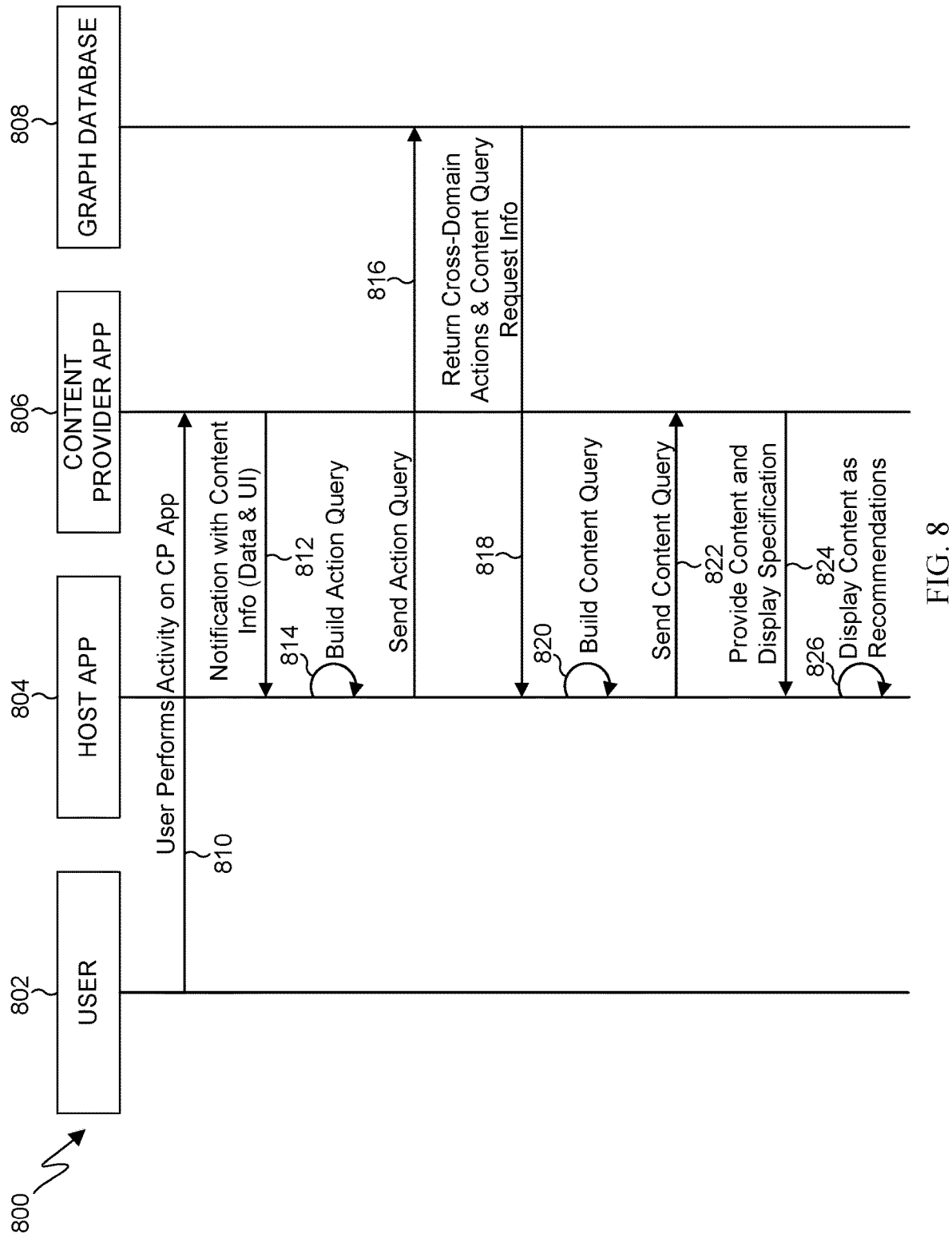
FIG. 8 illustrates a sequence diagram of an example cross-domain recommendation process in accordance with various embodiments of this disclosure.

FIG. 8 illustrates a sequence diagram of an example cross-domain recommendation process 800 in accordance with various embodiments of this disclosure. For ease of explanation, the process 800 is described with respect to the processor 120 of any, or a combination, of the electronic devices 101, 102, or 104, or the server 106. However, the process 800 can be used with any other suitable device(s) and in any suitable system.

As illustrated in FIG. 8, various steps of the process 800 are performed by a user 802, a host application 804, a content provider application 806, and a graph database 808. At step 810, the user 802 performs one or more activities using the content provider application 806, such as browsing content, reserving travel plans, restaurant reservations, event tickets, or other reservations types, consuming multimedia content, engaging in social media, or other activities. At step 812, the content provider application 806 transmits one or more notifications to the host application 804. The one or more notifications include content information, such as data and user interface information, related to the user activity performed in step 810.

At step 814, the host application 804 builds an action query based on the data received in the one or more notifications from the content provider application 806. In some embodiments, the action query can include details relating to the user activity and the contents associated therewith. For example, if the user activity includes booking a restaurant reservation, the query can include the reservation type, the restaurant name, the restaurant location, the date and time of the reservation, or other information. At step 816, the host application 804 transmits the action query to the graph database 808. In some embodiments, the graph database 808 can be local to the host application 804 or can be remote, such as on the server 106. In some embodiments, the server 106 can transmit a query to the graph database 808, such as when the graph database 808 is not stored on the server 106.

At step 818, the graph database 808 returns cross-domain actions and content query request information. The cross-domain actions are actions related to the user activity included in the action query transmitted to the graph database 808. For example, if the user activity performed in step 810 was booking a restaurant reservation, the cross-domain actions connected to a node in the graph database 808 for booking a restaurant reservation can include reserving a taxi to transport the user to the restaurant at the designated date and time, flight options if the restaurant location is a certain distance away from the known user information or the geolocation of the user at the time of the restaurant reservation booking, setting up a reminder for the restaurant reservation, or creating a social media post regarding the restaurant reservation. The content query request information returned with the cross-domain actions can include information for the host application 804 to use in requesting cross-domain actions from the appropriate content provider application 806. For example, returning a flight booking cross-domain action in response to the restaurant booking user activity can include the types of information used to book a flight, such as location information and date and time information. Since the host application 804 may have provided location and date and time information to the graph database 808 in the action query, this information for a flight booking can already be pre-filled as part of the content query request information returned to the host application 804.

At step 820, the host application 804 builds a content query using the cross-domain actions and content query request information received from the graph database 808. In some embodiments, the processor 120 or the server 106 can build the content query. The content query includes information for requesting content and display specification from a content provider application 806 with respect to the cross-domain actions to recommend to the user 802. At step 822, the host application 804 transmits the content query to the content provider application 806. At step 824, the content provider application 806 provides the requested content and display specification. The display specification defines how the cross-domain content and recommendation is to be displayed in the host application 804. The host application can generate one or more cross-domain recommendations based on the content and display specification. At step 826, the host application displays the content as recommendations for the user 802.

In some embodiments, the host application 804 displays the recommendation according to the content provider application's display specification so as to provide the user with consistent visual presentation of contents between the content provider application 806 and the recommendation displayed in the host application 804. Multiple recommendations for a single user activity can be displayed by the host application 804, providing multiple options for the user to choose from. In some embodiments, the cross-domain recommendations can include recommendations for applications or services that are not currently installed on the user's device. Also, in some embodiments, interacting with a recommendation displayed on the content provider application 806 causes the content provider application 806 to open or directs the user to the content provider's website to complete the action. In other embodiments, the cross-domain action can be completed without leaving the host application.

Figure 9:
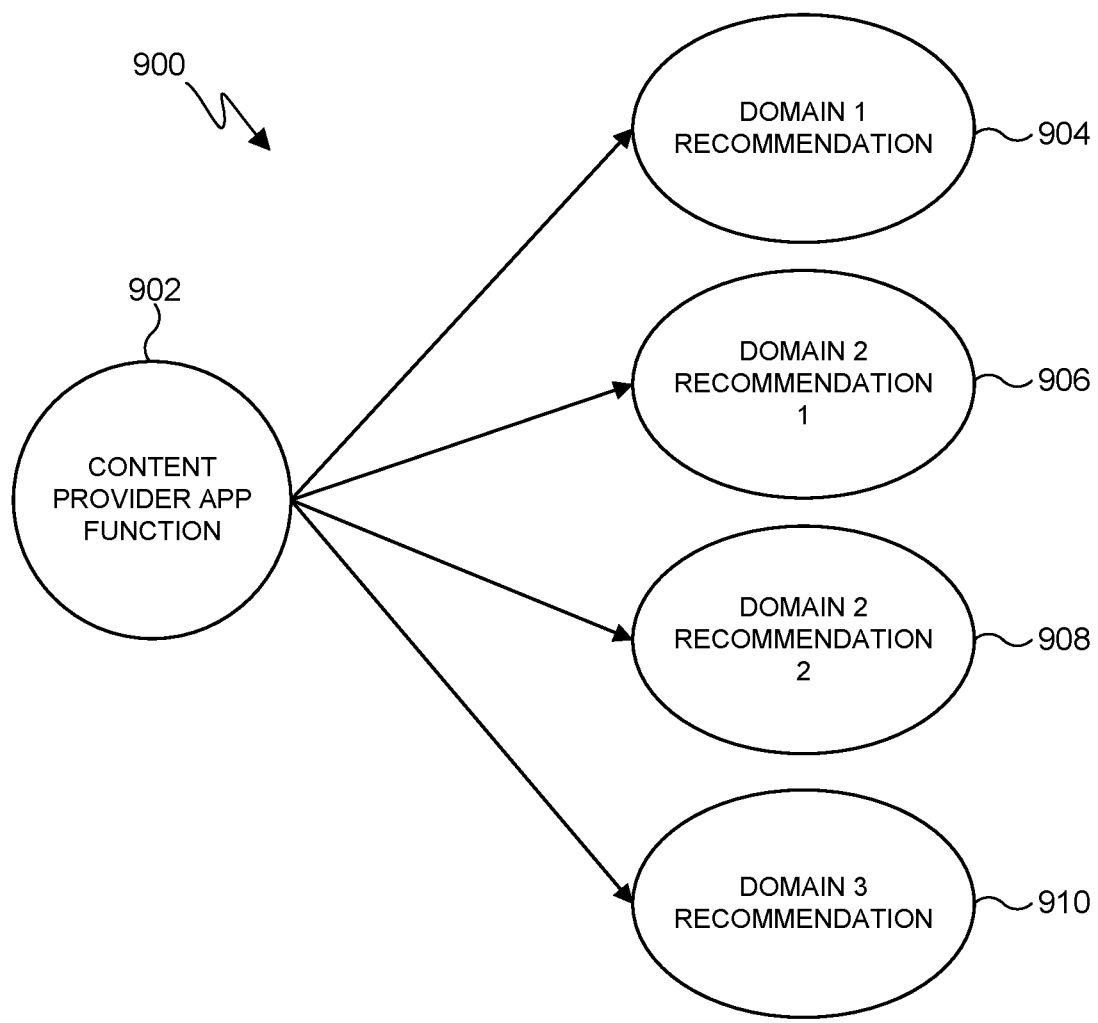
FIG. 9 illustrates an example cross-domain service co-reference event in accordance with various embodiments of this disclosure.

FIG. 9 illustrates an example cross-domain service co-reference event 900 in accordance with various embodiments of this disclosure. The nodes in FIG. 9 can be included in a graph database operating on any of the electronic devices 101, 102, 104 or the server 106. Service co-referencing refers to when two or more nodes have common cross-domain actions (nodes) connected by different paths. As illustrated in FIG. 9, a content provider application function node 902 is connected by relationship paths to cross-domain action nodes 904-910. The cross-domain action nodes 904-910 include a first domain recommendation node 904, a second domain recommendation node 906, another second domain recommendation node 908, and a third domain recommendation node 910.

As an example, if the content provider application function node 902 represents a sports event booking application reservation function, the first domain recommendation node 904 can represent a hotel reservation application function, the second domain recommendation node 906 can represent a sports news application function, the other second domain recommendation node 908 can represent a sports video streaming application function, and the third domain recommendation node 910 can represent a restaurant reservation application function. Each of the nodes 904-910 provides one or more recommendations for services in multiple domains and is similarly connected to the content provider application function node 902. This provides that, when the user performs the content application function of node 902, the user can be presented with recommendations from each of the nodes 904-910. Thus, service co-referencing allows for a single user action to trigger several recommendations across any number of domains.

Figure 10:
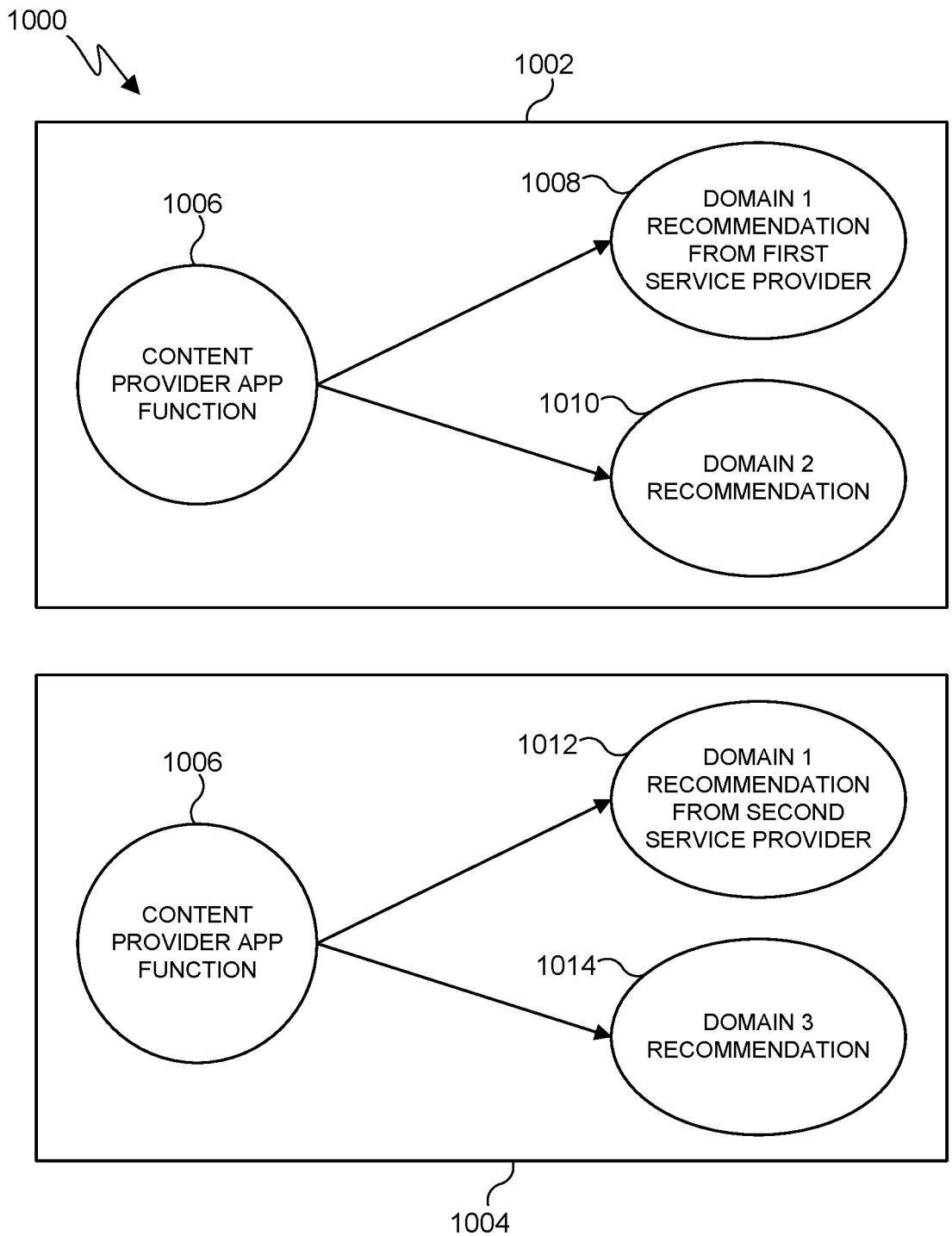
FIG. 10 illustrates an example cross-domain service co-occurrence in accordance with various embodiments of this disclosure.

FIG. 10 illustrates a diagram 1000 of an example cross-domain service co-occurrence in accordance with various embodiments of this disclosure. The diagram 1000 includes two separate user graphs 1002 and 1004. The graphs 1002 and 1004 can each be included as separate graphs in a graph database operating on any of the electronic devices 101, 102, 104 or the server 106. Service co-occurrence refers to when the same cross-domain actions occur in two or more user graphs. Since each user has one or more unique cross-domain relation entity graphs, there is an above-chance frequency of the occurrence of the same cross-domain action (with exact application fulfillment) in two or more user graphs.

As illustrated in FIG. 10, a content provider application function node 1006 in the graph 1002 is connected by relationship paths to a node 1008 representing a recommendation in a first domain from a first service provider and to a node 1010 representing a recommendation in a second domain. The graph 1004 includes the same content provider application function node 1006 as in the first graph 1002. Based on previous user activity or other learned factors, such as if the user often performs the content provider application function represented by the nodes 1006 but frequently chooses different service providers within the same domain for the same service, two user graphs 1002 and 1004 with the same node 1006 are created. In some embodiments, a default graph can be created that includes the node 1006, while another graph including the node 1006 is set up based on user actions.

The content provider application function node 1006 in graph 1004 is connected by relationship paths to a node 1012 representing a recommendation in a first domain from a second service provider and to a node 1014 representing a recommendation in a third domain. For example, if the nodes 1006 represent an action of booking a restaurant reservation, the graph 1002 provides a recommendation to call an UBER driver to transport the user to the restaurant from the node 1008. The user activity of booking a restaurant reservation also causes the node 1006 in the graph 1004 to trigger its associated recommendations, with the node 1012 providing a recommendation to call a LYFT driver. Thus, there is a co-occurrence of the same type of cross-domain action—calling a driver—triggered by the same action in different user graphs stored in the graph database. Service co-occurrence allows for users to be presented with multiple options for services and also can provide recommendations for services from service providers unknown to the user.

Figure 11:
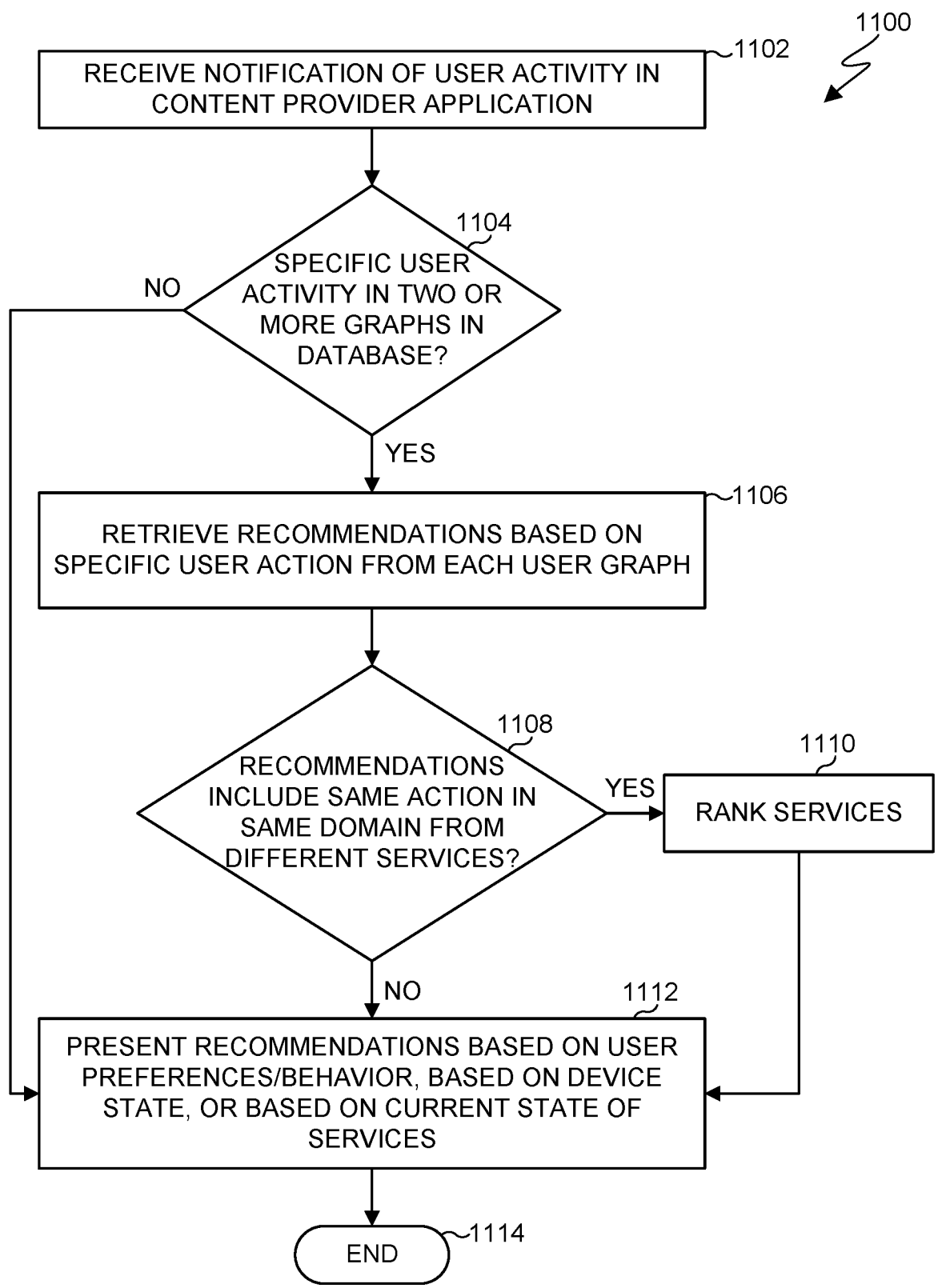
FIG. 11 illustrates a flowchart of an example cross-domain service co-occurrence process in accordance with various embodiments of this disclosure.

FIG. 11 illustrates a flowchart of an example cross-domain service co-occurrence process 1100 in accordance with various embodiments of this disclosure. FIG. 11 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 1100 is described with respect to the processor 120 of any, or a combination, of the electronic devices 101, 102, or 104, or the server 106. However, the process 1100 can be used with any other suitable device(s) and in any suitable system.

At block 1102, the processor receives a notification of user activity in a content provider application. At decision block 1104, the processor determines whether the specific user activity is represented by nodes in two or more graphs in a graph database. If not, the process 1100 moves to block 1112. If so, the process 1100 moves to block 1106. At block 1106, the processor retrieves recommendations based on the specific user action from each user graph. At decision block 1108, the processor determines whether any of the retrieved recommendations from the two or more user graphs include the same action in the same domain from different services. For example, if a recommendation from a first user graph is a recommendation to call an UBER driver and another recommendation from a second user graph is a recommendation to call a LYFT driver, there is a service action co-occurrence.

If the processor determines there is a service action co-occurrence at decision block 1108, the process 1100 moves to block 1110. At block 1110, the processor can rank the services in the same domain but from different providers based on factors such as previous user behavior, such as historically choosing one service provider over the other, service availability (such as if one service has a larger presence in the user's current geographic area), or other factors. The process 1100 then moves to block 1112. If the processor determines that the recommendations do not include the same action in the same domain from different services at decision block 1108, the process 1100 moves to block 1112. At block 1112, the processor presents the recommendations retrieved at block 1106 based on user preferences/behavior, device state, or a current state of recommended services. This presentation can provide a ranking of available services based on the user profile, device data, history, and other factors. The process 1100 then ends at end block 1114.

Figure 12:
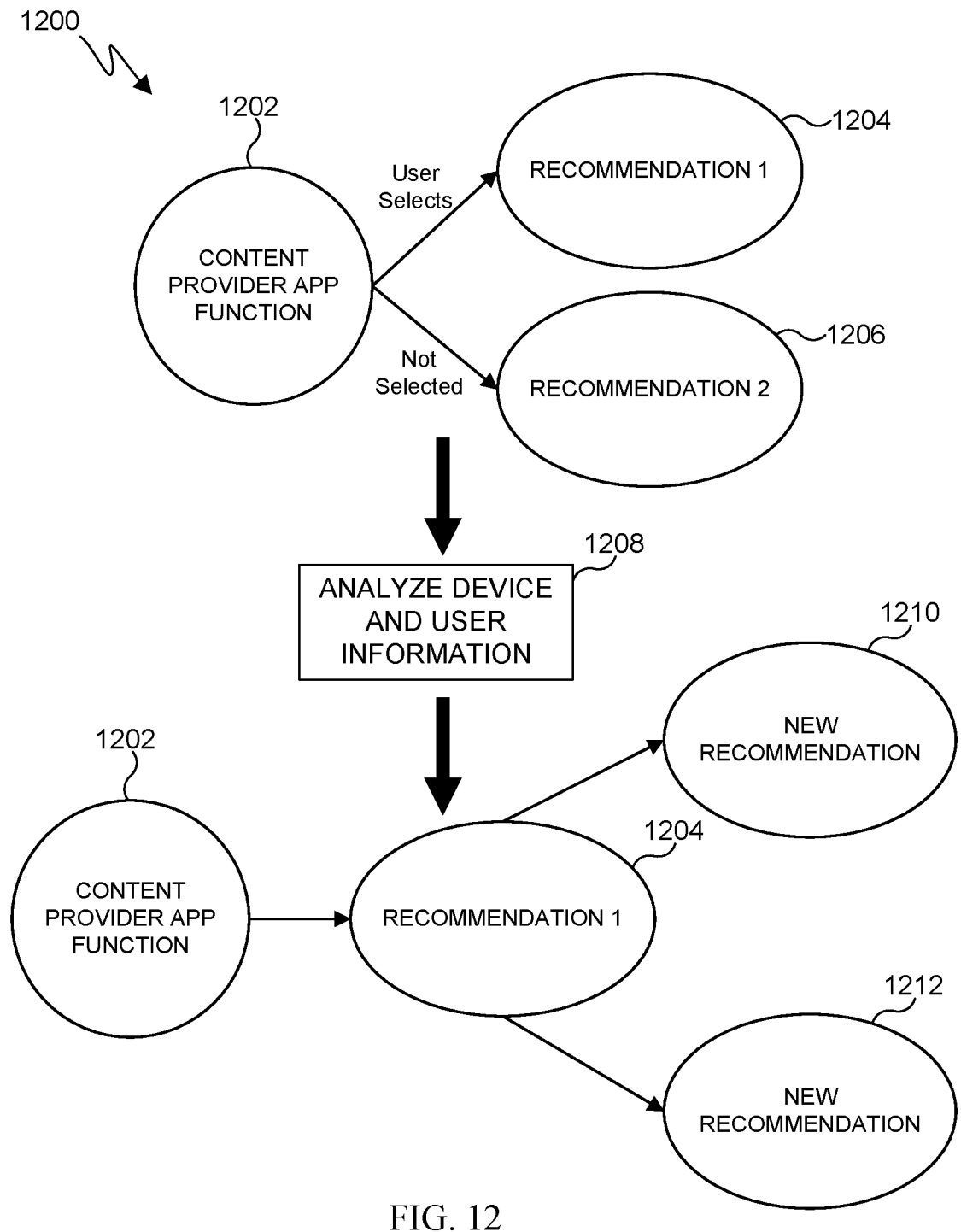
FIG. 12 illustrates an example graph database update process in accordance with various embodiments of this disclosure.

FIG. 12 illustrates an example graph database update process 1200 in accordance with various embodiments of this disclosure. As described in this disclosure, graphs managed by the graph database can be updated based on learning that is performed by the systems disclosed here. For instance, a feedback mechanism existing between relational intelligence in conjunction with user actions obtained through application signals and device information can derive a user graph that evolves dynamically. The feedback mechanism provides for relationship confidence, which provides that recommendations are provided in a unique order for every user based on the user's usage pattern of particular content provider applications, services, or features. The feedback mechanism also provides for relationship additions or other changes, such as adding cross-domain relationships for a particular node dynamically based on a user's new activities or deleting nodes or relationships based on a user's non-use of applications, services, or features. The feedback mechanism provides a capability to provide preference learning and derive frequency quotients.

As illustrated in FIG. 12, a node 1202 representing a content provider application function in a user graph is connected by paths to a first recommendation node 1204 and a second recommendation node 1206. In a particular recommendation event as illustrated in FIG. 12, the user selects the first recommendation and does not select the second recommendation. A result of the chosen recommendation, along with device and user information, is analyzed at a block 1208. In some embodiments, the server 106 analyzes the result and device and user information. In other embodiments, the user device analyzes the result and the device and user information, such as by using the host application on the user device. The analysis of the result and of the device and user information can, in some situations, trigger an update process of the user graph stored in the graph database. New or frequent actions by a user can trigger adding nodes or relationships between nodes in the user graph, while non-use or direct indication of unwanted actions can trigger deletion of nodes or relationships from the user graph. Additions or deletions from the user graph can be based on thresholds or other methods, such when a single instance of a user declining to use a recommended service does not necessarily cause a deletion.

The example illustrated in FIG. 12 shows an update to the user graph based on the user's selection. As a result of the analysis of the user choice and the device and user information, new nodes 1210 and 1212 are added to the user graph, representing new recommendations that can be triggered from a user choosing to perform the action of the first recommendation of node 1204. These new nodes 1210 and 1212 are added based on the user selecting the first recommendation of the node 1204, and the graph can now offer additional services related to the action of the node 1204. The user graph in FIG. 12 is also updated to delete the node 1206 representing the second recommendation. Such a deletion of a node or relationship can occur when the user frequently does not choose the recommendation.

Figure 13:
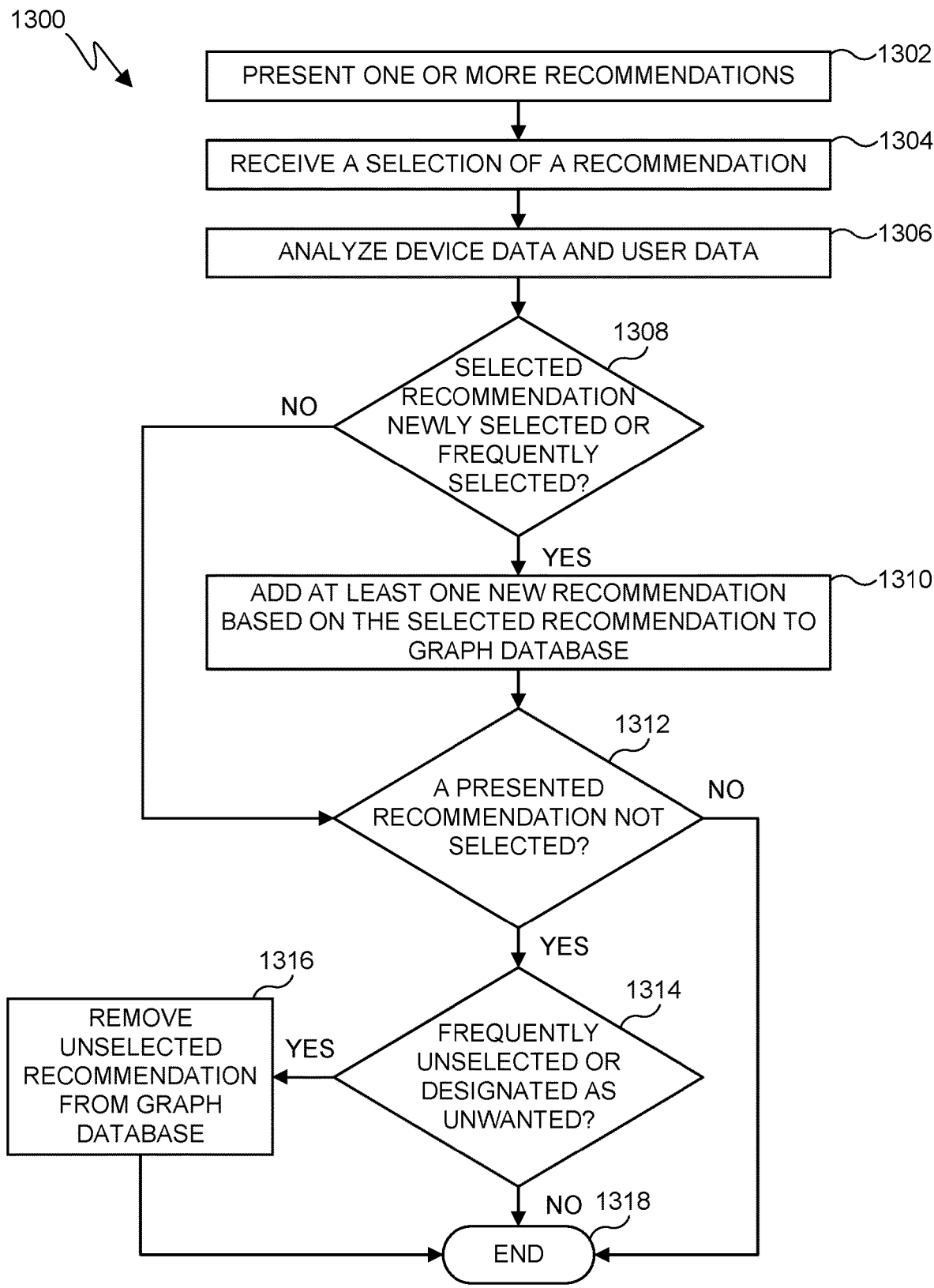
FIG. 13 illustrates a flowchart of an example graph database update process in accordance with various embodiments of this disclosure.

FIG. 13 illustrates a flowchart of an example graph database update process 1300 in accordance with various embodiments of this disclosure. FIG. 13 does not limit the scope of this disclosure to any particular embodiments. While the flowchart depicts a series of sequential steps, unless explicitly stated, no inference should be drawn from that sequence regarding specific order of performance, performance of steps or portions thereof serially rather than concurrently or in an overlapping manner, or performance of the steps depicted exclusively without the occurrence of intervening or intermediate steps. For ease of explanation, the process 1300 is described with respect to the processor 120 of any, or a combination, of the electronic devices 101, 102, or 104, or the server 106. However, the process 1300 can be used with any other suitable device(s) and in any suitable system.

At block 1302, the processor presents one or more recommendations, such as directly to a user or to a host application (which allows the host application to display the one or more recommendations). At block 1304, the processor receives a user selection of a recommendation from the one or more recommendations. At block 1306, the processor analyzes the device data and the user data. At decision block 1308, the processor determines if the selected recommendation is a newly-selected or frequently-selected recommendation. A frequently-selected recommendation can be determined by the processor based on a threshold, by using heuristic techniques, or by monitoring a number of uses of the recommendation over a period of time. If so, the process 1300 moves to block 1310. At block 1310, the processor adds at least one new recommendation based on the selected representation to the graph database. For instance, if the selected recommendation is an action for booking tickets for an event, a new recommendation can be added for creating a social media post based on booking an event. The newly-added recommendation can be triggered upon adding the new recommendation to the graph database, or the new recommendation can be triggered when the same action as in block 1304 is chosen again at another time. The process 1300 moves from block 1310 to decision block 1312. If the processor determines that there is no newly-selected or frequently-selected recommendation at decision block 1308, the process 1300 also moves to decision block 1312.

At decision block 1312, the processor determines if a presented recommendation from among the one or more recommendations presented in block 1302 was not selected. If not, the process 1300 moves to end block 1318. If so, the process moves to decision block 1314. At decision block 1314, the processor determines if the unselected recommendation is frequently unselected or otherwise is undesirable, such as if the user indicates that the user no longer wishes to see the recommendation. This can be inferred, such as when the user swipes the recommendation away on the display of the user device, or can be explicit, such as when the user specifically selects an option directly indicating that the user no longer wishes to see the recommendation.

If the processor does not determine that the unselected recommendation is frequently unselected or otherwise is undesirable at decision block 1314, the process 1300 moves to end block 1318. If the processor does determine that the unselected recommendation is frequently unselected or otherwise is undesirable at decision block 1314, the process 1300 moves to block 1316. At block 1316, the processor removes the unselected recommendation and any applicable relationships from the graph database. The process then ends at end block 1318.

Figure 14A:
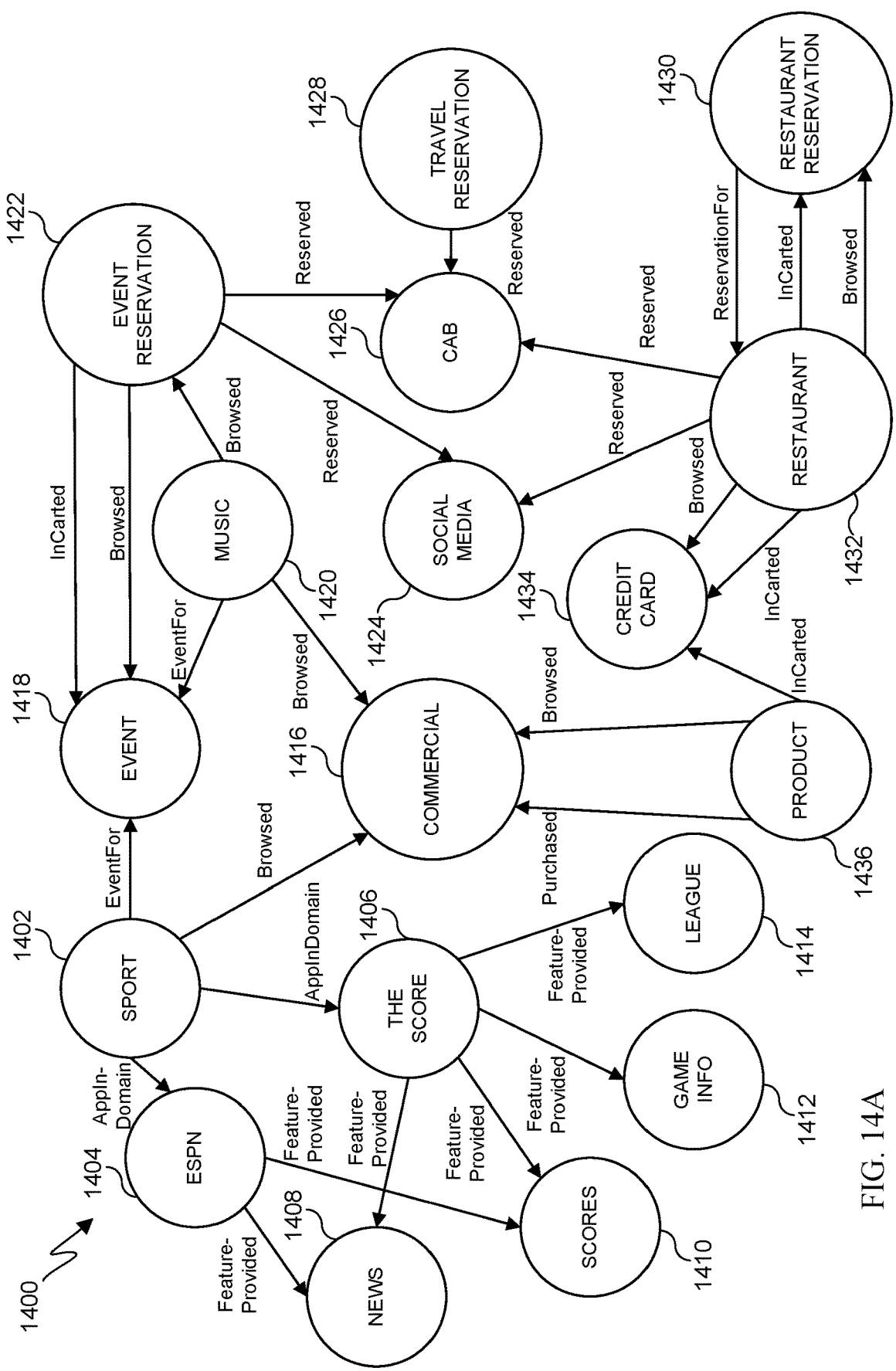
FIGS. 14A and 14B illustrate an example user graph in accordance with various embodiments of this disclosure.
Figure 14B:
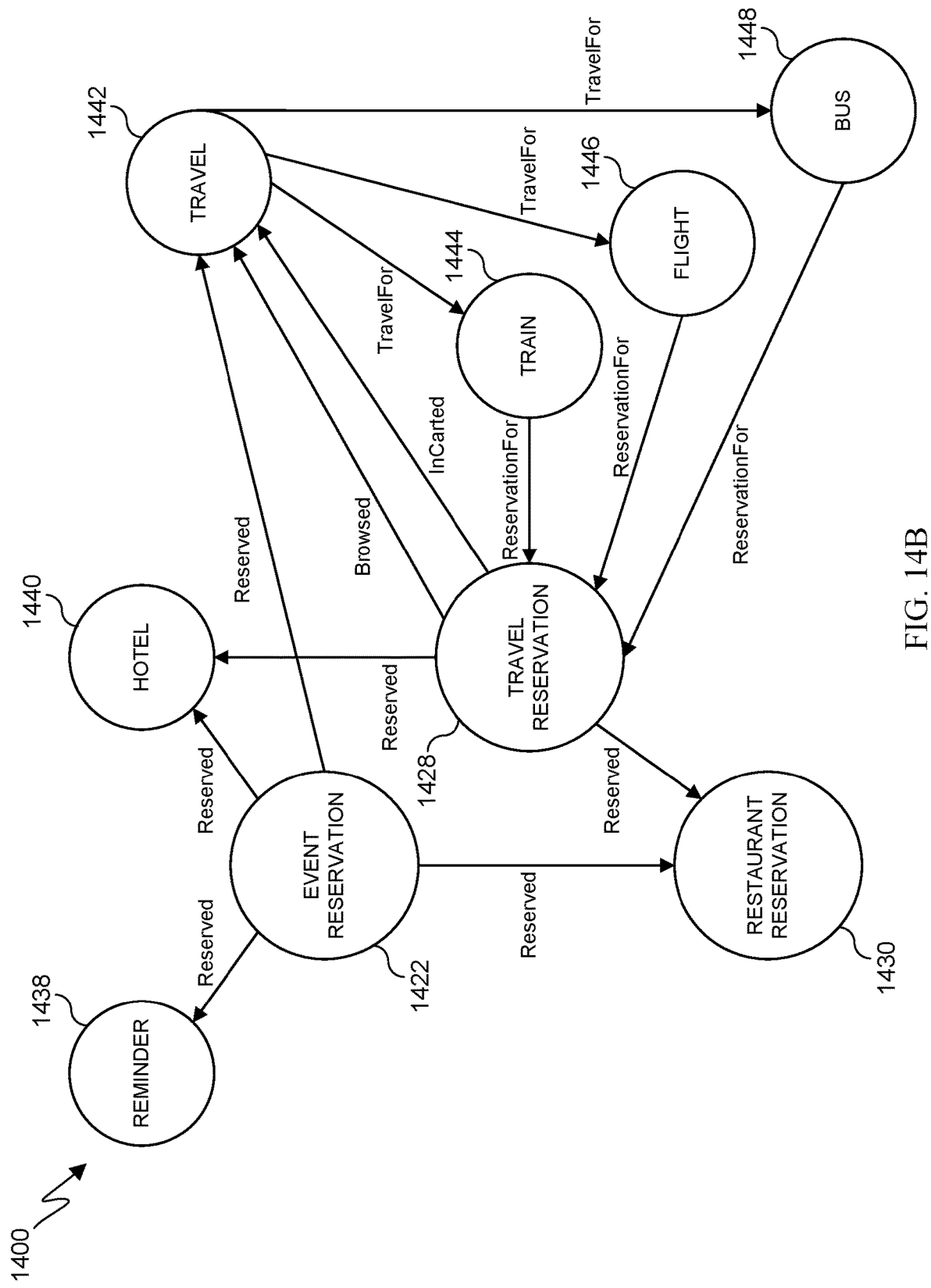

FIGS. 14A and 14B illustrate an example user graph 1400 in accordance with various embodiments of this disclosure. In particular, FIGS. 14A and 14B represent one interconnected user graph 1400 providing various cross-domain relationships. It will be understood that the graph 1400 is merely an example and does not limit the scope of this disclosure to any particular embodiments. As illustrated in FIG. 14A, a node representing a sports application is connected to other applications in the domain, such as an ESPN application node 1404 and a node 1406 for a sports application called THESCORE. The application node 1404 includes outgoing relationships to a sports news node 1408 and a sports scores node 1410. The application node 1406 includes outgoing relationships to a game information node 1412 and a league node 1414. As illustrates in FIG. 14A, the nodes 1408-1414 represent features provided by the applications represented by the nodes 1404 and 1406 in a sports domain represented by a sport domain node 1402.

The sport domain node 1402 also includes outgoing relationships to a commercial node 1416 and an event node 1418. The commercial node 1416 is triggered by browsing within the sport domain. For example, browsing sports teams on a user device can trigger the commercial node 1416, providing a commercial (either related to sports or not) to the user. The event node 1418 can also be triggered from the sport domain node 1402, which can trigger a recommendation of a sports event to the user. A music domain node 1420 can also trigger a recommendation provided by the event node 1418, such as if a user is viewing music-related content or using a music domain application. The music node 1420 has an outgoing relationship to the commercial node 1416 that can be triggered from a browsing action.

The music domain node 1420 also includes an outgoing relationship with an event reservation node 1422 that can be triggered from a browsing action in the music domain. The event reservation node 1422 can provide a recommendation to book a reservation for an event, such as a music event if the node 1422 is triggered from the node 1420. The event reservation node 1422 has an outgoing relationship to the event node 1418, which can be triggered by either buying (or placing tickets in an online shopping cart ("InCarted")) or by browsing information concerning an event. The event reservation node 1422 includes outgoing relationships to a social media node 1424 and a cab node 1426, which can both be triggered when a user makes a reservation for an event. The social media node 1424 provides a recommendation for the user to create a social media post regarding the event reservation. The cab node 1426 provides a recommendation for calling a cab or taxi to transport the user to the event. The cab node 1426 similarly includes an incoming relationship from a travel reservation node, which can be triggered by a user booking a travel reservation.

The graph 1400 further includes a restaurant reservation node 1430. The restaurant reservation node is illustrated as including two incoming relationships from a restaurant node 1432 having relationship types "InCarted" and "Browsed." The restaurant reservation node 1430 can be triggered by browsing information regarding a restaurant or purchasing an item, such as take away food, from a restaurant on a user device. The restaurant reservation node 1430 also includes an outgoing relationship to the restaurant node 1432 having a relationship type of "ReservationFor." The restaurant node 1432 has outgoing relationships to the cab node 1426 having a relationship type of "Reserved," to the social media node 1424 also having a relationship type of "Reserved," and to a credit card node 1434 having a relationship type of "InCarted." The credit card node 1434 provides a recommendation to use a credit card for items being purchased from a restaurant when triggered from the restaurant node 1432. The credit card node 1434 also includes an incoming relationship from a product node 1436 with an "InCarted" relationship. The product node 1436 includes two outgoing relationships to the commercial node 1416, which can be triggered by browsing or purchasing a product.

As illustrated in FIG. 14B, the event reservation node 1422, the travel reservation node 1428, and the restaurant reservation node 1430 include other incoming and/or outgoing relationships. It will be understood that the graph 1400 is one interconnected graph, and the connections to the event reservation node 1422, the travel reservation node 1428, and the restaurant reservation node 1430 illustrated in FIG. 14A remain intact when referring to FIG. 14B. As illustrated in FIG. 14B, the event reservation node 1422 includes outgoing relationships to a reminder node 1438 and a hotel node 1440, which can both be triggered from reserving an event. The reminder node 1438 can provide a recommendation to create a reminder for the reserved event, and the hotel node 1440 can provide a recommendation to book a hotel near the event. The event reservation node 1422 also includes outgoing relationships to the restaurant reservation node 1430 and a travel node 1442 both including the "Reserved" relationship type, which can provide recommendations to book a restaurant reservation or to book travel plans, respectively, in response to booking the event reservation.

The travel node 1442 includes two additional incoming relationships from the travel reservation node 1428, which can be triggered by either browsing or purchasing travel reservations. The travel reservation node 1428 also includes an outgoing relationship to the restaurant reservation node 1430, which can be triggered when a travel reservation is reserved. The travel node 1442 also includes outgoing relationships to a train node 1444, a flight node 1446, and a bus node 1448. These outgoing relationships from the node 1442 to the nodes 1444, 1446, and 1448 include a relationship type of "TravelFor," indicating a selected means of travel by a user. Each of the nodes 1444, 1446, and 1448 includes an outgoing relationship to the travel reservation node 1428 having a relationship type of "ReservationFor," indicating that the travel reservation node 1428 can be triggered when one or more transportation reservations are made.

Figure 15:
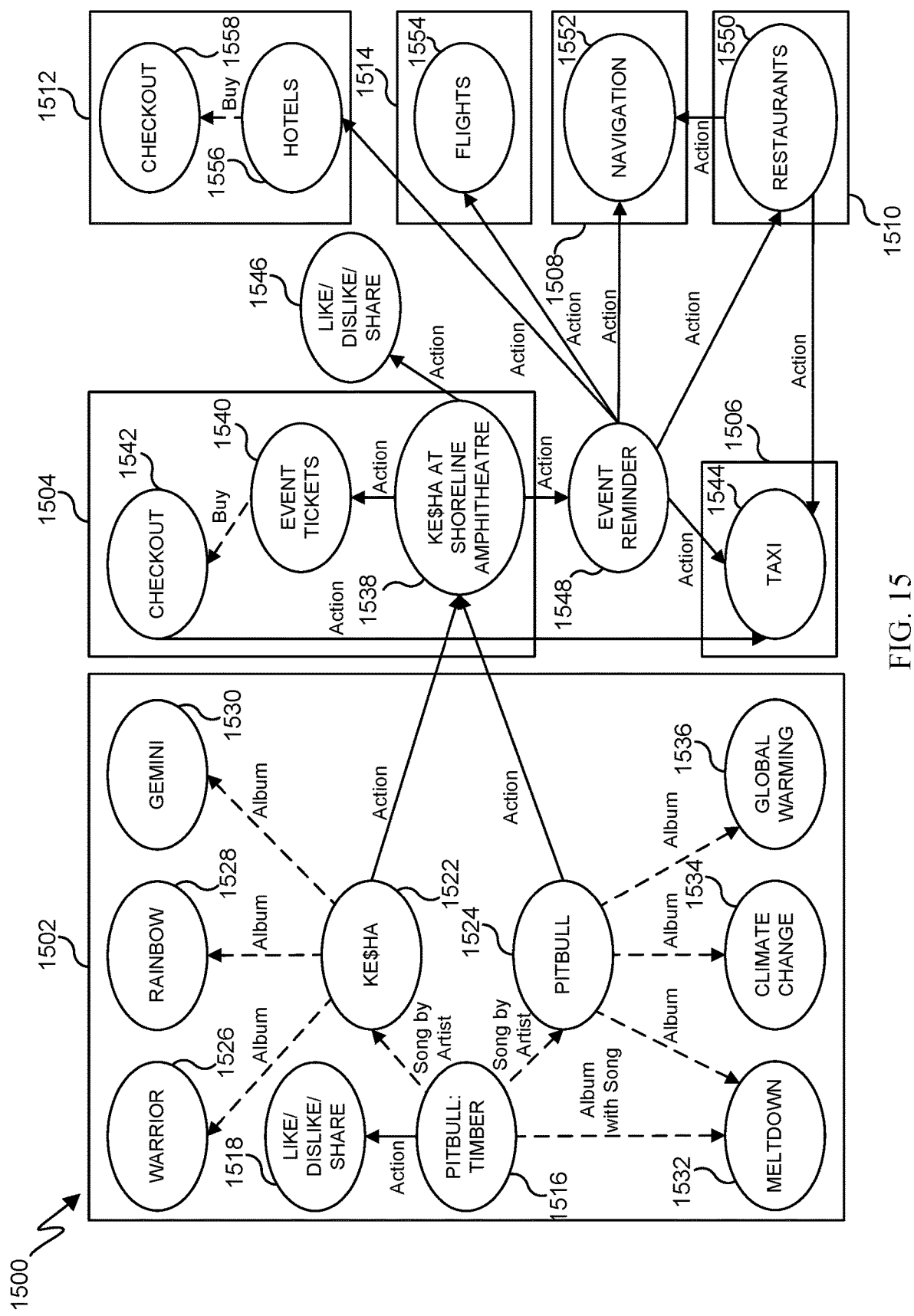
FIG. 15 illustrates an example user graph in accordance with various embodiments of this disclosure.

FIG. 15 illustrates an example user graph 1500 in accordance with various embodiments of this disclosure. As illustrated in FIG. 15, the graph 1500 includes actions in a music domain 1502. The actions can lead to recommendations in a concert or event domain 1504 from the music domain 1502, which further leads to other domains such as a transportation domain 1506, a navigation domain 1508, a restaurants domain 1510, a lodging domain 1512, a travel domain 1514, or other domains. The nodes in the graph 1500 are illustrated in this example as being linked by service events shown in dashed arrows and service actions shown in solid arrows. Service events represent connections within the same service such as the same application, while service actions represent connections between services.

The music domain 1502 includes a song node 1516 that represents a user listening to a song, "Timber" by artist "Pitbull" in this example. The song node 1516 is connected by a service action to a like/dislike/share node 1518. The song node 1516 is also connected to a plurality of other nodes by service event connections. The song node 1516 is connected to an album node 1532 that provides the name of the album that includes the song "Timber" and information related to the album to the user. The song node 1516 is also connected by service events to artist nodes 1522 and 1524, representing the artists Ke$ha and Pitbull, respectively, as the "Timber" song includes two artists. The Ke$ha artist node 1522 is connected by service events to Ke$ha album nodes 1526, 1528, and 1530 for the album titles "Warrior," "Rainbow," and "Gemini," respectively. The Pitbull artist node 1524 is connected by service events to album nodes 1532, 1534, and 1536 for the album titles "Meltdown," "Climate Change," and "Global Warming," respectively.

The Ke$ha artist node 1522 and the Pitbull artist node 1524 are connected by service actions to a cross-domain node 1538 for a Ke$ha concert event in the event domain 1504, providing a recommendation to a user viewing information on Ke$ha or Pitbull to view the Ke$ha concert event. The event node 1538 is connected by a service action to an event tickets node 1540, which is connected by a "buy" service event to a checkout node 1542, allowing a user to buy tickets for the Ke$ha concert event. The checkout node 1542 is connected by a service action to a taxi node 1544 in the transportation domain 1506. The Ke$ha concert event node 1538 is also connected by a service action to a like/dislike/share node 1546 and by a service action to an event reminder node 1548.

The event reminder node 1548 is connected by service actions to a plurality of nodes in other domains. The event reminder node 1548 is connected by a service action to a restaurants node 1550 in the restaurants domain 1510. The restaurants node 1550 is connected by service actions to the taxi node 1544 in the transportation domain 1506 and a navigation node 1552 in the navigation domain 1508. The event reminder node 1548 is also connected by a service action to a flights node 1554 in the travel domain 1514 and to a hotels node 1556 in the lodging domain 1512. The hotels node 1556 is connected by a service event to a checkout node 1558 in the lodging domain 1512.

Figure 16:
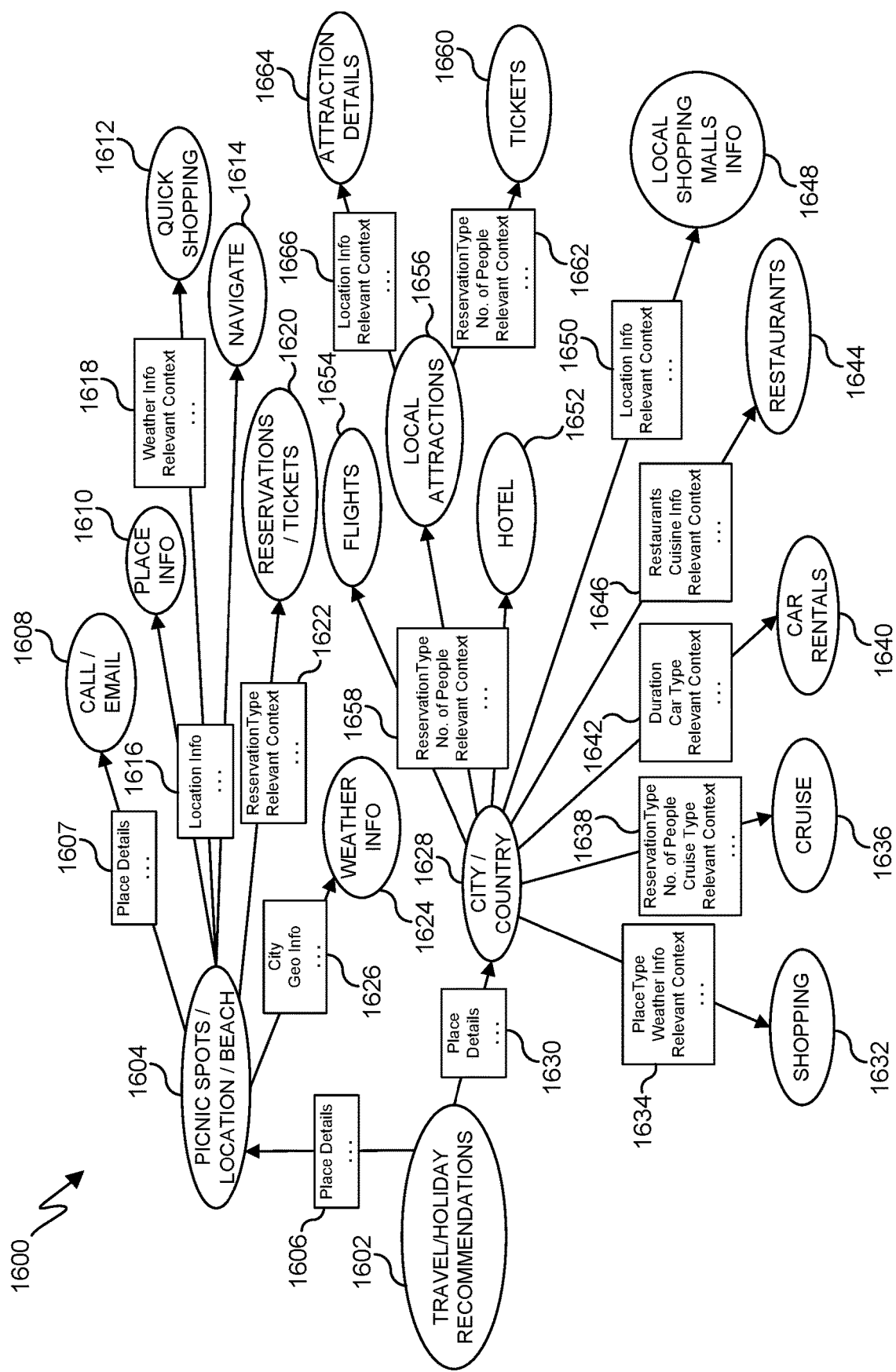
FIG. 16 illustrates an example user graph showing example properties in accordance with various embodiments of this disclosure.

FIG. 16 illustrates an example user graph 1600 showing example properties in accordance with various embodiments of this disclosure. The example properties shown in FIG. 16 provide examples for the types of data that can be passed between nodes to fulfill actions. The graph 1600 includes a travel/holiday recommendations node 1602 that leads to a series of nodes providing recommendations related to traveling. The travel/holiday recommendations node 1602 is connected to a picnic spots/location/beach node 1604 that provides recommendations concerning picnic spots, beaches, or other locations near where the user is traveling. The travel/holiday recommendations node 1602 can provide properties 1606 to other nodes that include place details concerning where the user is traveling, or other information. The picnic spots/location/beach node 1604 is connected to a plurality of other nodes such as a call/email node 1608 that includes properties 1607 like place details or other data and that can be triggered by a Call/Email action.

The picnic spots/location/beach node 1604 is also connected to a place information node 1610, a quick shopping node 1612, and a navigate node 1614, which are all passed properties 1616 including location information concerning the travel destination. The information node 1610, the quick shopping node 1612, and the navigate node 1614 can be triggered by a Find_PlaceInfo action, a Quick Purchase action, or a StartNavigation action, respectively. The quick shopping node 1612 can also be passed properties 1618 that can include weather information and relevant context information. The picnic spots/location/beach node 1604 is also connected to a reservations/tickets node 1620, which is provided properties 1622 including reservation type and relevant context data and can be triggered by a Make_Reservation action. The picnic spots/location/beach node 1604 is also connected to a weather information node 1624, which is provided properties 1626 including city and geolocation information and can be triggered by a Find_Weather action.

The travel/holiday recommendations node 1602 is also connected to a city/country node 1628 that is provided properties 1630 like place details and other information. The city/country node 1628 is connected to a shopping node 1632 that is provided properties 1634 like place type, weather information, relevant context information, or other data and can be triggered by a Quick_Purchase action. The city/country node 1628 is further connected to a cruise node 1636 that is provided properties 1638 like reservation type, number of people, cruise type, relevant context information, or other data and that can be triggered by a Find_CruiseDestinations action. The city/country node 1628 is further connected to a car rentals node 1640 that is provided properties 1642 like duration, car type, relevant context information, or other data and that can be triggered by a Book_Car action. The city/country node 1628 is further connected to a restaurants node 1644 that is provided properties 1646 like restaurant names, cuisine information, relevant context information, or other data and that can be triggered by a Find_Restaurants action. The city/country node 1628 is further connected to a local shopping malls information node 1648 that is provided properties 1650 like location information, relevant context information, or other data and that can be triggered by a Find_ShoppingMalls action.

The city/country node 1628 is further connected to a hotel node 1652, a flights node 1654, and a local attractions node 1656 that are each provided properties 1658 like reservation type, number of people, relevant context information, or other data. The hotel node 1652 and the flights node 1654 can be triggered by a Book_Hotel action and a Reserve_Flight action, respectively. The local attractions node 1656 is connected to a tickets node 1660 that is provided properties 1662 like reservation type, number of people, relevant context information, or other data and that can be triggered by a Buy_Tickets action. The local attractions node 1656 is further connected to an attraction details node 1664 that is provided properties 1666 like location information, relevant context, or other data and that can be triggered by a Show_MoreInfo action.

Although this disclosure has been described with an exemplary embodiment, various changes and modifications may be suggested to one skilled in the art. It is intended that this disclosure encompass such changes and modifications as fall within the scope of the appended claims.

What is claimed is:

1. An electronic device, comprising:
   a memory; and
   at least one processor coupled to the memory, wherein the at least one processor is configured to:
   receive one or more notifications of at least one user activity in a first content provider application;
   build at least one action query based on the one or more notifications;
   provide the at least one action query to a graph database, wherein the graph database defines relationship paths linking actions executable in different content provider applications;
   receive at least one cross-domain action from the graph database in response to the at least one action query, the at least one cross-domain action associated in the graph database with the at least one user activity;
   receive a display specification from a second content provider application, wherein the display specification defines a visual presentation consistent with how information is displayed in the second content provider application and identifies at least a portion of a user interface from the second content provider application;
   generate at least one cross-domain recommendation recommending execution by the electronic device of the at least one cross-domain action using at least the second content provider application; and
   instruct a host application to display the at least one cross-domain recommendation in accordance with the display specification using at least the portion of the user interface from the second content provider application.

2. The electronic device of claim 1, wherein the at least one cross-domain recommendation includes two or more co-occurring cross-domain recommendations from one or more graphs in the graph database.

3. The electronic device of claim 1, wherein the at least one processor is further configured to provide information to update the graph database, wherein the information includes one or more user activities in one or more content provider applications.

4. The electronic device of claim 3, wherein the information to update the graph database causes the graph database to add one or more nodes to the graph database, wherein the one or more nodes are defined by one or more action results in the one or more content provider applications.

5. The electronic device of claim 3, wherein the information to update the graph database causes the graph database to delete one or more nodes from the graph database.

6. A method, comprising:
   receiving one or more notifications of at least one user activity in a first content provider application;
   building at least one action query based on the one or more notifications;
   providing the at least one action query to a graph database, wherein the graph database defines relationship paths linking actions executable in different content provider applications;
   receiving at least one cross-domain action from the graph database in response to the at least one action query, the at least one cross-domain action associated in the graph database with the at least one user activity;
   receiving a display specification from a second content provider application, wherein the display specification defines a visual presentation consistent with how information is displayed in the second content provider application and identifies at least a portion of a user interface from the second content provider application;
   generating at least one cross-domain recommendation recommending execution of the at least one cross-domain action using at least the second content provider application; and
   instructing a host application to display the at least one cross-domain recommendation in accordance with the display specification using at least the portion of the user interface from the second content provider application.

7. The method of claim 6, wherein the at least one cross-domain recommendation includes two or more co-occurring cross-domain recommendations from one or more graphs in the graph database.

8. The method of claim 6, further comprising providing information to update the graph database, wherein the information includes one or more user activities in one or more content provider applications.

9. The method of claim 8, wherein the information to update the graph database causes the graph database to add one or more nodes to the graph database, wherein the one or more nodes are defined by one or more action results in the one or more content provider applications.

10. The method of claim 8, wherein the information to update the graph database causes the graph database to delete one or more nodes from the graph database.

11. A non-transitory computer readable medium embodying a computer program for operating an electronic device including a memory and at least one processor, the computer program comprising computer readable instructions that, when executed by the at least one processor, cause the electronic device to:
    receive one or more notifications of at least one user activity in a first content provider application;
    build at least one action query based on the one or more notifications;
    provide the at least one action query to a graph database, wherein the graph database defines relationship paths linking actions executable in different content provider applications;
    receive at least one cross-domain action from the graph database in response to the at least one action query, the at least one cross-domain action associated in the graph database with the at least one user activity;
    receive a display specification from a second content provider application, wherein the display specification defines a visual presentation consistent with how information is displayed in the second content provider application and identifies at least a portion of a user interface from the second content provider application;
    generate at least one cross-domain recommendation recommending execution by the electronic device of the at least one cross-domain action using at least the second content provider application; and instruct a host application to display the at least one cross-domain recommendation in accordance with the display specification using at least the portion of the user interface from the second content provider application.

12. The non-transitory computer readable medium of claim 11, wherein the at least one cross-domain recommendation includes two or more co-occurring cross-domain recommendations from one or more graphs in the graph database.

13. The non-transitory computer readable medium of claim 11, wherein the computer program further comprises computer readable instructions that, when executed by the at least one processor, cause the electronic device to provide information to update the graph database, wherein the information includes one or more user activities in one or more content provider applications.

14. The non-transitory computer readable medium of claim 13, wherein the information to update the graph database causes the graph database to add one or more nodes to the graph database, wherein the one or more nodes are defined by one or more action results in the one or more content provider applications.

15. The non-transitory computer readable medium of claim 13, wherein the information to update the graph database causes the graph database to delete one or more nodes from the graph database.

16. The electronic device of claim 1, wherein:
the at least one action query includes information used in the at least one user activity in the first content provider application; and
the at least one cross-domain action includes at least a portion of the information for use by the second content provider application during execution of the at least one cross-domain action.

17. The method of claim 6, wherein:
the at least one action query includes information used in the at least one user activity in the first content provider application; and
the at least one cross-domain action includes at least a portion of the information for use by the second content provider application during execution of the at least one cross-domain action.

18. The non-transitory computer readable medium of claim 11, wherein:
the at least one action query includes information used in the at least one user activity in the first content provider application; and
the at least one cross-domain action includes at least a portion of the information for use by the second content provider application during execution of the at least one cross-domain action.

19. The electronic device of claim 1, wherein the at least one processor is further configured to:
build a content query;
send the content query to the second content provider application; and
receive the display specification and content of the second content provider application from the second content provider application in response to the content query;
wherein the at least one cross-domain recommendation is based on the content of the second content provider application.

20. The method of claim 6, further comprising:
building a content query;
sending the content query to the second content provider application; and
receiving the display specification and content of the second content provider application from the second content provider application in response to the content query;
wherein the at least one cross-domain recommendation is based on the content of the second content provider application.

* * * * *